US012620249B2

(12) United States Patent
Yebes Torres et al.

(10) Patent No.: US 12,620,249 B2
(45) Date of Patent: May 5, 2026

(54) METHODS, SYSTEMS, ARTICLES OF MANUFACTURE AND APPARATUS TO IMPROVE TAGGING ACCURACY

(71) Applicant: Nielsen Consumer LLC, Chicago, IL (US)

(72) Inventors: Jose Javier Yebes Torres, Valladolid (ES); Sricharan Amarnath, West Chennai (IN); Roberto Arroyo, Madrid (ES)

(73) Assignee: Nielsen Consumer LLC, Chicago, IL (US)

( * ) Notice: Subject to any disclaimer, the term of this patent is extended or adjusted under 35 U.S.C. 154(b) by 881 days.

(21) Appl. No.: 17/941,547

(22) Filed: Sep. 9, 2022

(65) Prior Publication Data

US 2023/0245486 A1 Aug. 3, 2023

(30) Foreign Application Priority Data

Jan. 31, 2022 (IN) .............................. 202211005270

(51) Int. Cl.
*G06V 30/413* (2022.01)
*G06F 9/30* (2018.01)
*G06V 30/42* (2022.01)

(52) U.S. Cl.
CPC ........ *G06V 30/413* (2022.01); *G06F 9/30003* (2013.01); *G06V 30/42* (2022.01)

(58) Field of Classification Search
None
See application file for complete search history.

(56) References Cited

U.S. PATENT DOCUMENTS

| | | | |
|---|---|---|---|
| 3,323,135 A | 6/1967 | Miller | |
| 5,410,611 A | 4/1995 | Huttenlocher et al. | |
| 5,606,690 A | 2/1997 | Hunter | |
| 7,454,063 B1 | 11/2008 | Kneisl et al. | |

(Continued)

FOREIGN PATENT DOCUMENTS

| | | |
|---|---|---|
| CA | 2957433 C | 6/2020 |
| CN | 100369049 C | 2/2008 |

(Continued)

OTHER PUBLICATIONS

Chen et al., "TextPolar: irregular scene text detection using polar representation," International Journal on Document Analysis and Recognition (IJDAR), 2021, published May 23, 2021, 9 pages.

(Continued)

*Primary Examiner* — Andrew H Lam
(74) *Attorney, Agent, or Firm* — Hanley, Flight & Zimmerman, LLC

(57) ABSTRACT

Methods, apparatus, systems, and articles of manufacture are disclosed to improve tagging accuracy. An example apparatus includes at least one memory, machine readable instructions, and processor circuitry to execute the machine readable instructions to at least search a first row of a document to identify a first row that includes a first type of entity, search the first row of the document to identify a second type of entity that is missing, search the first row of the document to identify a first integer value, and associate the first row with a product corresponding to the first integer value.

10 Claims, 17 Drawing Sheets

(56) References Cited

U.S. PATENT DOCUMENTS

| | | | |
|---|---|---|---|
| 7,792,709 B1 | 9/2010 | Trandal | |
| 8,285,047 B2 | 10/2012 | Nagarajan et al. | |
| 8,494,281 B2 | 7/2013 | Nagarajan | |
| 8,787,695 B2 | 7/2014 | Wu | |
| 8,792,141 B2 | 7/2014 | Moore et al. | |
| 8,983,170 B2 | 3/2015 | Nepomniachtchi | |
| 9,014,432 B2 | 4/2015 | Fan | |
| 9,158,744 B2 | 10/2015 | Venkata Radha Krishna Rao | |
| 9,239,952 B2 | 1/2016 | Hsu | |
| 9,262,686 B1 | 2/2016 | Singer | |
| 9,290,022 B2 | 3/2016 | Makabe | |
| 9,298,685 B2 | 3/2016 | Barrus | |
| 9,298,979 B2 | 3/2016 | Nepomniachtchi | |
| 9,323,135 B1 | 4/2016 | Veloso | |
| 9,324,073 B2 | 4/2016 | Nepomniachtchi | |
| 9,384,389 B1 | 7/2016 | Sankaranarayanan | |
| 9,384,839 B2 | 7/2016 | Avila | |
| 9,396,540 B1 | 7/2016 | Sampson | |
| 9,684,842 B2 | 6/2017 | Deng | |
| 9,710,702 B2 | 7/2017 | Nepomniachtchi | |
| 9,747,504 B2 | 8/2017 | Ma | |
| 9,760,786 B2 | 9/2017 | Sahagun et al. | |
| 9,824,270 B1 | 11/2017 | Mao | |
| 9,875,385 B1 | 1/2018 | Humphreys | |
| 10,026,061 B2 | 7/2018 | Cheek | |
| 10,032,072 B1 | 7/2018 | Tran et al. | |
| 10,157,425 B2 | 12/2018 | Chelst | |
| 10,235,585 B2 | 3/2019 | Deng | |
| 10,242,285 B2 | 3/2019 | Thrasher et al. | |
| 10,395,772 B1 | 8/2019 | Lucas et al. | |
| 10,679,283 B1 | 6/2020 | Pesce | |
| 11,032,072 B2 | 6/2021 | Andon | |
| 11,256,760 B1 | 2/2022 | Corcoran | |
| 11,257,049 B1 | 2/2022 | Durazo Almeida | |
| 11,321,956 B1 | 5/2022 | Geng | |
| 11,410,446 B2 * | 8/2022 | Shanmuganathan ......................... G06V 10/457 |
| 11,414,053 B2 | 8/2022 | Tanaami et al. | |
| 11,468,491 B2 | 10/2022 | Dalal | |
| 11,476,981 B2 | 10/2022 | Wei et al. | |
| 11,562,557 B2 | 1/2023 | Miginnis et al. | |
| 11,587,148 B2 | 2/2023 | Elder | |
| 11,593,552 B2 | 2/2023 | Sarkar | |
| 11,609,956 B2 | 3/2023 | Jain | |
| 11,625,930 B2 | 4/2023 | Rodriguez et al. | |
| 11,809,985 B2 | 11/2023 | Polanía Cabrera | |
| 11,810,380 B2 * | 11/2023 | Arroyo ..................... G06N 3/09 |
| 11,810,383 B2 | 11/2023 | Patel et al. | |
| 11,842,035 B2 | 12/2023 | Jahjah et al. | |
| 12,315,283 B2 | 5/2025 | Arroyo et al. | |
| 2002/0037097 A1 | 3/2002 | Hoyos | |
| 2003/0185448 A1 | 10/2003 | Seeger et al. | |
| 2006/0232619 A1 | 10/2006 | Otsuka | |
| 2006/0245650 A1 | 11/2006 | Jun | |
| 2007/0033533 A1 | 2/2007 | Sull | |
| 2007/0041642 A1 | 2/2007 | Romanoff et al. | |
| 2008/0205759 A1 | 8/2008 | Zandifar et al. | |
| 2009/0164422 A1 | 6/2009 | Pacella | |
| 2010/0306080 A1 | 12/2010 | Trandal | |
| 2011/0122443 A1 | 5/2011 | Otsuka | |
| 2011/0243445 A1 | 10/2011 | Uzelac et al. | |
| 2011/0289395 A1 | 11/2011 | Breuel et al. | |
| 2011/0311145 A1 | 12/2011 | Bern | |
| 2012/0183211 A1 | 7/2012 | Hsu | |
| 2012/0274953 A1 | 11/2012 | Makabe | |
| 2012/0330971 A1 | 12/2012 | Thomas | |
| 2013/0058575 A1 | 3/2013 | Koo et al. | |
| 2013/0170741 A9 | 7/2013 | Hsu et al. | |
| 2014/0002868 A1 | 1/2014 | Landa et al. | |
| 2014/0064618 A1 | 3/2014 | Janssen, Jr. | |
| 2014/0188647 A1 | 7/2014 | Argue | |
| 2014/0195891 A1 | 7/2014 | Venkata Radha Krishna Rao | |
| 2015/0039479 A1 | 2/2015 | Gotanda | |
| 2015/0127428 A1 | 5/2015 | Gharachorloo | |
| 2015/0169951 A1 | 6/2015 | Khintsitskiy | |
| 2015/0254778 A1 | 9/2015 | Kmak et al. | |
| 2015/0317642 A1 | 11/2015 | Argue | |
| 2015/0363792 A1 | 12/2015 | Arini | |
| 2015/0363822 A1 | 12/2015 | Rowe | |
| 2016/0005189 A1 | 1/2016 | Gray | |
| 2016/0034863 A1 | 2/2016 | Ross | |
| 2016/0063469 A1 | 3/2016 | Etzion | |
| 2016/0125383 A1 | 5/2016 | Chan | |
| 2016/0171585 A1 | 6/2016 | Singh | |
| 2016/0203625 A1 | 7/2016 | Khan et al. | |
| 2016/0210507 A1 | 7/2016 | Abdollahian | |
| 2016/0234431 A1 | 8/2016 | Kraft et al. | |
| 2016/0307059 A1 | 10/2016 | Chaudhury et al. | |
| 2016/0342863 A1 | 11/2016 | Kwon | |
| 2016/0350954 A1 | 12/2016 | Agarwala | |
| 2017/0206536 A1 | 7/2017 | Brelig | |
| 2017/0293819 A1 | 10/2017 | Deng | |
| 2017/0329749 A1 * | 11/2017 | Milward ................. G06F 40/18 |
| 2017/0364450 A1 | 12/2017 | Struttmann | |
| 2018/0005345 A1 | 1/2018 | Apodaca et al. | |
| 2018/0053045 A1 | 2/2018 | Lorenzini | |
| 2018/0060302 A1 | 3/2018 | Liang | |
| 2018/0317116 A1 | 11/2018 | Komissarov | |
| 2018/0336509 A1 | 11/2018 | Guttmann | |
| 2019/0026803 A1 | 1/2019 | De Guzman | |
| 2019/0050639 A1 | 2/2019 | Ast | |
| 2019/0080207 A1 | 3/2019 | Chang | |
| 2019/0130622 A1 | 5/2019 | Hoover | |
| 2019/0171900 A1 | 6/2019 | Thrasher | |
| 2019/0244020 A1 | 8/2019 | Yoshino | |
| 2019/0272360 A1 | 9/2019 | Kursun | |
| 2019/0325211 A1 | 10/2019 | Ordonez et al. | |
| 2019/0332662 A1 | 10/2019 | Middendorf | |
| 2019/0354818 A1 | 11/2019 | Reisswig | |
| 2020/0097718 A1 | 3/2020 | Schäfer | |
| 2020/0097759 A1 * | 3/2020 | Nadim ................... G06N 20/00 |
| 2020/0142856 A1 | 5/2020 | Neelamana | |
| 2020/0151444 A1 | 5/2020 | Price | |
| 2020/0151902 A1 | 5/2020 | Almazán | |
| 2020/0175267 A1 | 6/2020 | Schäfer | |
| 2020/0190963 A1 | 6/2020 | Gooneratne | |
| 2020/0249803 A1 | 8/2020 | Sobel et al. | |
| 2020/0279107 A1 | 9/2020 | Staar | |
| 2020/0364451 A1 | 11/2020 | Ammar et al. | |
| 2020/0401798 A1 | 12/2020 | Foncubierta Rodriguez et al. | |
| 2020/0410231 A1 | 12/2020 | Chua | |
| 2021/0004880 A1 | 1/2021 | Benkreira et al. | |
| 2021/0009163 A1 | 1/2021 | Urtasun | |
| 2021/0019287 A1 | 1/2021 | Prasad et al. | |
| 2021/0034856 A1 | 2/2021 | Torres et al. | |
| 2021/0090694 A1 | 3/2021 | Colley et al. | |
| 2021/0117665 A1 | 4/2021 | Simantov | |
| 2021/0117668 A1 | 4/2021 | Zhong et al. | |
| 2021/0149926 A1 | 5/2021 | Komninos et al. | |
| 2021/0158038 A1 | 5/2021 | Shanmuganathan et al. | |
| 2021/0216765 A1 | 7/2021 | Xu | |
| 2021/0248420 A1 | 8/2021 | Zhong et al. | |
| 2021/0295101 A1 | 9/2021 | Tang et al. | |
| 2021/0319217 A1 | 10/2021 | Wang et al. | |
| 2021/0334737 A1 | 10/2021 | Balaji | |
| 2021/0343030 A1 | 11/2021 | Sagonas et al. | |
| 2021/0357710 A1 | 11/2021 | Zhang | |
| 2021/0406533 A1 | 12/2021 | Arroyo | |
| 2022/0004756 A1 | 1/2022 | Jennings | |
| 2022/0114821 A1 | 4/2022 | Arroyo et al. | |
| 2022/0156489 A1 | 5/2022 | Agarwal | |
| 2022/0180113 A1 | 6/2022 | Patel | |
| 2022/0189190 A1 | 6/2022 | Arroyo et al. | |
| 2022/0198185 A1 | 6/2022 | Prebble | |
| 2022/0350946 A1 | 11/2022 | Hjerrild | |
| 2022/0383651 A1 | 12/2022 | Shanmuganathan | |
| 2022/0397809 A1 | 12/2022 | Talpade et al. | |
| 2022/0414630 A1 * | 12/2022 | Yebes Torres ......... G06V 30/42 |
| 2023/0004748 A1 | 1/2023 | Rodriguez et al. | |
| 2023/0005286 A1 | 1/2023 | Yebes Torres et al. | |
| 2023/0008198 A1 | 1/2023 | Gadde et al. | |
| 2023/0057687 A1 | 2/2023 | Mantri | |
| 2023/0065915 A1 * | 3/2023 | Berestovsky ........... G06F 18/22 |
| 2023/0196806 A1 | 6/2023 | Ramalingam et al. | |

(56)                     References Cited

U.S. PATENT DOCUMENTS

| | | | |
|---|---|---|---|
| 2023/0214899 A1 | 7/2023 | Martínez Cebrián et al. | |
| 2023/0230408 A1* | 7/2023 | Arroyo | G06V 30/42 |
| | | | 382/156 |
| 2023/0306203 A1 | 9/2023 | Hoang | |
| 2023/0394859 A1 | 12/2023 | Montero et al. | |
| 2024/0013562 A1 | 1/2024 | Montero | |

FOREIGN PATENT DOCUMENTS

| | | | |
|---|---|---|---|
| CN | 103123685 A | 5/2013 | |
| CN | 104866849 A | 8/2015 | |
| CN | 108229397 A | 6/2018 | |
| CN | 108829397 A | 11/2018 | |
| CN | 109389124 A | 2/2019 | |
| CN | 108229397 B | 8/2020 | |
| CN | 112380835 A | 2/2021 | |
| CN | 112446351 A | 3/2021 | |
| CN | 112560862 A | 3/2021 | |
| CN | 113282726 A | 8/2021 | |
| CN | 112699662 B | 8/2022 | |
| CN | 115017144 A | 9/2022 | |
| CN | 112907973 B | 4/2023 | |
| DE | 202013005144 U1 | 10/2013 | |
| GB | 2595412 A | 11/2021 | |
| JP | H0749529 A | 2/1995 | |
| JP | H0749529 B2 | 5/1995 | |
| JP | 2008021850 A | 1/2008 | |
| JP | 2008210850 A | 9/2008 | |
| JP | 2008211850 A | 9/2008 | |
| JP | 2019139737 A | 8/2019 | |
| JP | 7049529 B2 | 4/2022 | |
| KR | 101831204 B1 | 2/2018 | |
| WO | 2013044145 A1 | 3/2013 | |
| WO | 2018054326 A1 | 3/2018 | |
| WO | 2018201423 A1 | 11/2018 | |
| WO | 2020194004 A1 | 10/2020 | |
| WO | 2022006295 A1 | 1/2022 | |
| WO | 2022123199 A1 | 6/2022 | |

OTHER PUBLICATIONS

Shen et al., "LayoutParser: A Unified Toolkit for Deep Learning Based Document Image Analysis," in International Conference on Document Analysis and Recognition (ICDAR), Jun. 1, 2021, 16 pages. [retrieved from: https://arxiv.org/pdf/2103.15348.pdf].

Hwang et al., "Spatial Dependency Parsing for Semi-Structured Document Information Extraction," in International Joint Conference on Natural Language Processing (IJCNLP), Jul. 1, 2021, 14 pages. [retrieved from: https://arxiv.org/pdf/2005.00642.pdf].

Hong et al., "BROS: A Pre-trained Language Model Focusing on Text and Layout for Better Key Information Extraction from Documents," arXiv (CoRR), Sep. 10, 2021, 13 pages. [retrieved from: https://arxiv.org/pdf/2108.04539.pdf].

Appalaraju et al., "DocFormer: End-to-End Transformer for Document Understanding," arXiv (CoRR), Sep. 20, 2021, 22 pages. [retrieved from: https://arxiv.org/pdf/2106.11539.pdf].

International Searching Authority, "International Preliminary Report on Patentability" mailed in connection With International Patent Application No. PCT/IB2019/000299, issued on Sep. 28, 2021, 5 pages.

United States Patent and Trademark Office, "Final Office Action," issued in connection with U.S. Appl. No. 16/692,797, dated Oct. 27, 2021, 14 pages.

International Searching Authority, "Written Opinion of the International Searching Authority," issued in connection with PCT No. PCT/US2021/039931, Nov. 4, 2021, 4 pages.

International Searching Authority, "International Search Report," issued in connection with PCT No. PCT/US2021/039931, Nov. 4, 2021, 3 pages.

United States Patent and Trademark Office, "Advisory Action," issued in connection with U.S. Appl. No. 16/692,797, dated Feb. 16, 2022, 2 pages.

Github, "Doccano tool," Github.com, downloaded on Apr. 1, 2022, 12 pages. [retrieved from:https://github.com/doccano/doccano].

Github, "FIAT tool—Fast Image Data Annotation Tool," Github. com, downloaded on Apr. 1, 2022,30 pages. [retrieved from: https://github.com/christopher5106/FastAnnotationTool].

Datasetlist, "Annotation tools for building datasets," Labeling tools—List of labeling tools, Datasetlist.com, updated Dec. 2021, downloaded on Apr. 1, 2022, 12 pages. [retrieved from:https://www.datasetlist.com/tools/].

NielsenIQ Brandbank, "Nielsen Brandbank Product Library," Online Available. Retrieved on Apr. 1, 2022, 5 pages. [retrieved from: https://www.brandbank.com/us/product-library/].

United States Patent and Trademark Office, "Notice of Allowance and Fee(s)Due," issued in connection with U.S. Appl. No. 16/692,797, issued Apr. 5, 2022, 10 pages.

United States Patent and Trademark Office, "Corrected Notice of Allowability,"issued in connection with U.S. Appl. No. 16/692,797, issued Apr. 22, 2022, 3 pages.

International Searching Authority, "International Preliminary Report on Patentability," mailed in connection with International Patent Application No. PCT/US2020/061269,on May 17, 2022, 5 pages.

Datasetlist, "A tool using OpenCV to annotate images for image classification, optical character reading, . . . , " Datasetlist.com, dated Jul. 13, 2022, 30 pages.

United States Patent and Trademark Office, "Non-Final Office Action," issued in connection with U.S. Appl. No. 17/345,940, dated Aug. 18, 2022, 8 Pages.

Crandall et al., "Extraction of special effects caption text events from digital video," IJDAR, Department of Computer Science and Engineering, The Pennsylvania State University, 202 Pond Laboratory, University Park, PA, accepted Sep. 13, 2022, pp. 138-157, 20 pages.

United States Patent and Trademark Office, "Non-Final Office Action" , issued in connection with U.S. Appl. No. 17/075,675, issued Sep. 22, 2022, 12 Pages.

European Patent Office, "European Search Report," issued in connection with European patent appl. No. 19921870, Oct. 12, 2022, 11 pages.

International Searching Authority, "Written Opinion," issued in connection with PCT No. PCT/US2022/034570, Oct. 20, 2022, 5 pages.

International Searching Authority, "International Search Report," issued in connection with PCT No. PCT/US2022/034570, Oct. 20, 2022, 3 pages.

United States Patent and Trademark Office, "Notice of Allowance," issued in connection with U.S. Appl. No. 17/075,675, issued Jun. 26, 2023, 8 pages.

United States Patent and Trademark Office, "Notice of Allowance," issued in connection with U.S. Appl. No. 17/364,419, Nov. 4, 2022, 10 pages.

Canadian Patent Office, "Examiner's Report," issued in connection with Canadian Patent Application No. 3,124,868, mailed on Nov. 10, 2022, 4 pages.

United States Patent and Trademark Office, "Corrected Notice of Allowability", issued in connection with U.S. Appl. No. 17/364,419, Nov. 15, 2022, 2 pages.

European Patent Office, "European Search Report," issued in connection with European patent appl. No. 22180113.7-1207, Nov. 22, 2022, 31 pages.

European Patent Office, "European Search Report," issued in connection with European patent appl. No. 22184405.3-1207, Dec. 2, 2022, 7 pages.

United States Patent and Trademark Office, "Non-Final Office Action," issued in connection with U.S. Appl. No. 17/379,280, dated Dec. 2, 2022, 14 Pages.

International Searching Authority, "International Preliminary Report on Patentability," issued in connection with PCT No. PCT/US2021/039931, issued Dec. 13, 2022, 5 pages.

United States Patent and Trademark Office, "Notice of Allowance", issued in connection with U.S. Appl. No. 17/364,419, Jan. 4, 2023, 2 pages.

(56) References Cited

OTHER PUBLICATIONS

United States Patent and Trademark Office, "Non-Final Office Action", issued in connection with U.S. Appl. No. 17/883,309, Jan. 20, 2023, 14 pages.

United States Patent and Trademark Office, "Corrected Notice of Allowability", issued in connection with U.S. Appl. No. 17/364,419, Feb. 15, 2023, 2 pages.

United Kingdom Patent Office, "Examination Report under section 18(3)," in connection with Great Britain Patent Application No. 2112299.9, issued Feb. 17, 2023, 2 pages.

United States Patent and Trademark Office, "Final Office Action" , issued in connection with U.S. Appl. No. 17/075,675, issued Mar. 7, 2023, 11 Pages.

United States Patent and Trademark Office, "Non-Final Office Action," issued in connection with U.S. Appl. No. 17/345,940, dated Mar. 16, 2023, 13 Pages.

United States Patent and Trademark Office, "Final Office Action," issued in connection with U.S. Appl. No. 17/379,280, dated May 5, 2023, 17 pages.

United States and Patent and Trademark Office, "Corrected Notice of Allowance and Fee(s) Due," issued in connection with U.S. Appl. No. 17/883,309, dated May 11, 2023, 9 pages.

European Patent Office, "Extended European Search Report," issued in connection with European Patent Application No. 22214553.4, dated May 17, 2023, 9 pages.

United States Patent and Trademark Office, "Advisory Action," issued in connection with U.S. Appl. No. 17/075,675, issued May 30, 2023, 3 pages.

United States Patent and Trademark Office, "Corrected Notice of Allowability," issued in connection with U.S. Appl. No. 17/710,660, dated Oct. 9, 2024, 2 pages.

United States Patent and Trademark Office, "Corrected Notice of Allowability," issued in connection with U.S. Appl. No. 17/598,792, dated Oct. 10, 2024, 2 pages.

United States Patent and Trademark Office, "Corrected Notice of Allowability," issued in connection with U.S. Appl. No. 18/191,642, dated Oct. 11, 2024, 2 pages.

United States Patent and Trademark Office, "Second Corrected Notice of Allowability," issued in connection with U.S. Appl. No. 18/191,642, dated Nov. 22, 2024, 2 pages.

European Patent Office, "Communication pursuant to Article 94(3) EPC," issued in connection with European Patent Application No. 22180113.7, Jan. 7, 2025, 6 pages.

European Patent Office, "Communication pursuant to Article 94(3) EPC," issued in connection with European Patent Application No. 22214553.4, dated Jan. 7, 2025 2 pages.

European Patent Office, "Communication pursuant to Article 94(3) EPC," issued in connection with European Patent Application No. 22180113.7-1207, Jan. 7, 2025, 6 pages.

United States Patent and Trademark Office, "Notice of Allowance and Fee(s) Due," issued in connection with U.S. Appl. No. 18/148,947, dated Jan. 8, 2025, 12 pages.

United States Patent and Trademark Office, "Notice of Allowance and Fee(s) Due," issued in connection with U.S. Appl. No. 17/710,649, dated Jan. 16, 2025, 9 pages.

Visich, "Bar Codes and Their Applications," Research Foundation of State University of New York, 1990, 59 pages.

Leicester et al., "Using Scanner Technology to Collect Expenditure Data," Fiscal Studies, vol. 30, Issue 3-4, 2009, 29 pages.

Xu et al., "LayoutLMv2: Multi-modal Pre-training for Visually-rich Document Understanding," 59th Annual Meeting of the Association for Computational Linguistics (ACL), arXiv, dated Jan. 10, 2022, 13 pages.

United States Patent and Trademark Office, "Non-Final Office Action," issued in connection with U.S. Appl. No. 17/598,792, dated Dec. 29, 2023, 17 pages.

International Searching Authority, "International Preliminary Report on Patentability," issued in connection with International Patent Application No. PCT/US2022/034570, issued on Jan. 4, 2024, 7 pages.

United States Patent and Trademark Office, "Non-Final Office Action," issued in connection with U.S. Appl. No. 18/191,642, dated Feb. 7, 2024, 18 pages.

United States and Patent and Trademark Office, "Non-Final Office Action," issued in connection with U.S. Appl. No. 17/566,135, dated Mar. 27, 2024, 13 pages.

European Patent Office, "Communication pursuant to Article 94(3) EPC," issued in connection with European Patent Application No. 19 921 870.2-1207, on Apr. 9, 2024, 7 pages.

United States Patent and Trademark Office, "Non-Final Office Action," issued in connection with U.S. Appl. No. 18/476,978, dated Apr. 18, 2024, 20 pages.

United States Patent and Trademark Office, "Notice of Allowance and Fee(s) Due," issued in connection with U.S. Appl. No. 17/710,538, dated Apr. 19, 2024, 8 pages.

United States Patent and Trademark Office, "Supplemental Notice of Allowability," issued in connection with U.S. Appl. No. 17/710,538, dated May 8, 2024, 3 pages.

Canadian Intellectual Property Office, "Examiner requisition," issued in connection with Canadian Patent Application No. 3,182,471, dated May 28, 2024, 5 pages.

United States and Patent and Trademark Office, "Non-Final Office Action," issued in connection with U.S. Appl. No. 17/710,660, on May 28, 2024, 9 pages.

United States Patent and Trademark Office, "Notice of Allowance and Fee(s) Due," issued in connection with U.S. Appl. No. 17/598,792, dated Jun. 17, 2024, 9 pages.

United States Patent and Trademark Office, "Notice of Allowance and Fee(s) Due," issued in connection with U.S. Appl. No. 18/191,642, dated Jun. 17, 2024, 9 pages.

United States Patent and Trademark Office, "Corrected Notice of Allowability," issued in connection with U.S. Appl. No. 17/598,792, dated Jul. 3, 2024, 2 pages.

United States Patent and Trademark Office, "Final Office Action," issued in connection with U.S. Appl. No. 17/566,135, dated Jul. 25, 2024, 17 pages.

United States Patent and Trademark Office, "Final Office Action," issued in connection with U.S. Appl. No. 18/476,978, dated Aug. 14, 2024, 22 pages.

United States Patent and Trademark Office, "Notice of Allowance and Fee(s) Due," issued in connection with U.S. Appl. No. 17/710,538, dated Aug. 14, 2024, 8 pages.

International Searching Authority, "International Preliminary Report on Patentability," issued in connection with International Application No. PCT/US2023/011859, mailed on Aug. 15, 2024, 6 pages.

United States Patent and Trademark Office, "Notice of Allowance and Fee(s) Due," issued in connection with U.S. Appl. No. 17/598,792, dated Aug. 27, 2024, 9 pages.

United States Patent and Trademark Office, "Notice of Allowance and Fee(s) Due," issued in connection with U.S. Appl. No. 18/191,642, dated Aug. 28, 2024, 7 pages.

United States Patent and Trademark Office, "Advisory Action," issued in connection with U.S. Appl. No. 18/476,978, dated Oct. 7, 2024, 3 pages.

United States Patent and Trademark Office, "Notice of Allowance and Fee(s) Due," issued in connection with U.S. Appl. No. 17/566,135, dated Oct. 11, 2024, 9 pages.

United States Patent and Trademark Office, "Corrected Notice of Allowability," issued in connection with U.S. Appl. No. 17/566,135, dated Oct. 23, 2024, 9 pages.

United States Patent and Trademark Office, "Corrected Notice of Allowability," issued in connection with U.S. Appl. No. 17/710,660, dated Oct. 30, 2024, 2 pages.

United States Patent and Trademark Office, "Notice of Allowance and Fee(s) Due," issued in connection with U.S. Appl. No. 17/872,801, dated Jan. 30, 2025, 13 pages.

European Patent Office, "Communication pursuant to Article 94(3) EPC," issued in connection with European Application No. 22184405.3, dated Mar. 19, 2025, 4 pages.

United States Patent and Trademark Office, "Non-Final Office Action," issued in connection with U.S. Appl. No. 18/176,273, dated Apr. 24, 2025, 7 pages.

(56) References Cited

OTHER PUBLICATIONS

Poulovassilis et al., "A Nested-Graph Model for the Representation and Manipulation of Complex Objects," ACM Transactions on Information Systems, vol. 12, Issue 1, Jan. 2, 1994, 34 pages.

Hochreiter et al., "Long Short-Term Memory," Neural Computation, Dec. 1997, 32 pages.

Ng et al., "On Spectral Clustering: Analysis and an Algorithm," NIPS'01: Proceedings of the 14th International Conference on Neural Information Processing Systems: Natural and Synthetic, Jan. 2001, 8 pages.

Oliveira et al., "A New Method for Text-Line Segmentation for Warped Documents," International Conference Image Analysis and Recognition, Jun. 21, 2010, 11 pages.

Chung et al., "Empirical Evaluation of Gated Recurrent Neural Networks on Sequence Modeling." NIPS 2014 Deep Learning and Representation Workshop, Dec. 2014, 9 pages.

Kipf et al., "Semi-Supervised Classification with Graph Convolutional Networks," 5th International Conference on Learning Representations, Apr. 24, 2017, 14 Pages.

Velickcvic et al., "Graph Attention Networks," 2018 International Conference on Learning Representations, Apr. 30, 2018 12 pages.

Elfwing et al. "Sigmoid-Weighted Linear Units for Neural Network Function Approximation in Reinforcement Learning," Neural Networks: Journal of the International Neural Network Society, vol. 107, Nov. 2018, 18 pages.

Park et al., "CORD: A Consolidated Receipt Dataset for Post-OCR Parsing," NeurIPS Workshop on Document Intelligence, 2019, 4 pages.

Loshchilov et al., "Decoupled Weight Decay Regularization," 2019 International Conference on Learning Representations, May 6, 2019, 19 pages.

Stackoverflow, "How Do I Make Masks to Set All of Image Background, Except the Text, to White?," URL: [https://stackoverflow.com/questions/56465359/how-do-i-make-masks-to-set-all-of-image-background-except-the-text-to-white], published Jun. 5, 2019, 7 pages.

Hu et al., "Semi-Supervised Node Classification via Hierarchical Graph Convolutional Networks." 2019 International Joint Conference on Artificial Intelligence, Aug. 10, 2019, 8 pages.

Guillaume et al., "FUNSD: A Dataset for Form Understanding in Noisy Scanned Documents," International Conference on Document Analysis and Recognition (ICDAR), Sep. 20, 2019, 6 pages.

Yadati et al., "HyperGCN: Hypergraph Convolutional Networks for Semi-Supervised Classification," Proceedings of the 33rd International Conference on Neural Information Processing Systems, Dec. 2019, 18 pages.

Wang et al., "DocStruct: A Multimodal Method to Extract Hierarchy Structure in Document for General Form Understanding," 2020 Conference Empirical Methods in Natural Language Processing (EMNLP), Nov. 16, 2020, 11 pages.

Dong et al., "HNHN: Hypergraph Networks with Hyperedge Neurons." ArXiv abs/2006.12278, Jun. 22, 2020, 11 pages.

Bandyopadhyay et al., "Hypergraph Attention Isomorphism Network by Learning Line Graph Expansion," 2020 IEEE International Conference on Big Data, Dec. 10, 2020, 10 pages.

Carbonell et al., "Named Entity Recognition and Relation Extraction with Graph Neural Networks in Semi Structured Documents," 2020 International Conference on Pattern Recognition (ICPR), Jan. 10, 2021, 6 pages.

Liu et al., "ROBERTa: A Robustly Optimized BERT Pretraining Approach," International Conference on Learning Representations, Apr. 30, 2020, 13 pages.

Chen et al., "HGMF: Heterogeneous Graph-Based Fusion for Multimodal Data with Incompleteness," Proceedings of the 26th ACM SIGKDD International Conference on Knowledge Discovery & Data Mining, dated Aug. 20, 2020, 11 pages.

Zhu et al., "Heterogeneous Mini-Graph Neural Network and Its Application to Fraud Invitation Detection," 2020 IEEE International Conference on Data Mining (ICDM), Nov. 17, 2020, 9 pages.

Huang et al., "UniGNN: a Unified Framework for Graph and Hypergraph Neural Networks," 30th International Joint Conference on Artificial Intelligence (IJCAI), Aug. 19, 2021, 9 pages.

Davis et al., "Visual FUDGE: Form Understanding via Dynamic Graph Editing," International Conference on Document Analysis and Recognition (ICDAR), Sep. 5, 2021, 16 pages.

Powalski et al., "Going Full-TILT Boogie on Document Understanding with Text-Image-Layout Transformer," International Conference on Document Analysis and Recognition, Sep. 5, 2021, 17 pages.

Nguyen Dang et al., "End-to-End Hierarchical Relation Extraction for Generic Form Understanding," International Conference on Pattern Recognition (ICPR), Jan. 10, 2021, 8 pages.

Garncarek et al., "LAMBERT: Layout-Aware Language Modeling for Information Extraction," International Conference on Document Analysis and Recognition (ICDAR), Sep. 5, 2021, 16 pages.

Li et al., "StructuralLM: Structural Pre-Training for Form Understanding." 59th Annual Meeting of the Association for Computational Linguistics, Aug. 2021, 10 pages.

Xu et al., "LayoutXLM: Multimodal Pre-Training for Multilingual Visually-rich Document Understanding," arXiv, Apr. 2021, 10 pages.

Ma et al., "Graph Attention Networks with Positional Embeddings," Pacific-Asia Conference on Knowledge Discovery and Data Mining, May 11, 2021, 13 pages.

Li et al. "SelfDoc: Self-Supervised Document Representation Learning," 2021 IEEE/CVF Conference on Computer Vision and Pattern Recognition (CVPR), Jun. 20, 2021, 10 pages.

Tang et al., "MatchVIE: Exploiting Match Relevancy between Entities for Visual Information Extraction," 2021 International Joint Conference on Artificial Intelligence (IJCAI), Aug. 19, 2021, 7 pages.

Qian et al., "A Region-Based Hypergraph Network for Joint Entity-Relation Extraction," Knowledge-Based Systems. vol. 228, Sep. 2021, 8 pages.

Prabhu et al., "MTL-FoUn: A Multi-Task Learning Approach to Form Understanding," 2021 International Conference on Document Analysis and Recognition (ICDAR), Sep. 5, 2021, 5 pages.

Li et al., "StrucTexT: Structured Text Understanding with Multi-Modal Transformers," ACM International Conference on Multimedia (ACM Multimedia), Oct. 2021, 9 pages.

Hwang et al., "Cost-effective End-to-end Information Extraction for Semi-structured Document Images," Empirical Methods in Natural Language Processing (EMNLP), Nov. 7, 2021, 9 pages.

Zhang et al., "Entity Relation Extraction as Dependency Parsing in Visually Rich Documents," Empirical Methods in Natural Language Processing (EMNLP), Nov. 7, 2021, 10 pages.

Gu et al., "UniDoc: Unified Pretraining Framework for Document Understanding," Neural Information Processing Systems (NeurIPS), Dec. 6, 2021, 12 pages.

Huang et al., "LayoutLMv3: Pre-Training for Document AI with Unified Text and Image Masking," 30th ACM International Conference on Multimedia, Oct. 2022, 10 pages.

Wang et al., "LiLT: A Simple Yet Effective Language-Independent Layout Transformer for Structured Document Understanding," Annual Meeting of the Association for Computational Linguistics (ACL), May 22, 2022, 11 pages.

Zhangxuan et al., "XYLayoutLM: Towards Layout-Aware Multimodal Networks For Visually-Rich Document Understanding," Conference on Computer Vision and Pattern Recognition (CVPR), Jun. 18, 2022, 10 pages.

Villota et al., "Text Classification Models for Form Entity Linking," International Symposium on Distributed Computing and Artificial Intelligence, Jul. 13, 2022, 10 pages.

Zhang et al., "Multimodal Pre-Training Based on Graph Attention Network for Document Understanding." IEEE Transactions on Multimedia, vol. 25, Oct. 12, 2022, 13 pages.

Kim et al., "Donut: Document Understanding Transformer Without OCR," European Conference on Computer Vision, Oct. 23, 2022, 29 pages.

United States Patent and Trademark Office, "Advisory Action," issued in connection with U.S. Appl. No. 17/379,280, mailed on Jul. 18, 2023, 3 pages.

(56)  References Cited

OTHER PUBLICATIONS

Zhong et al., "Hierarchical Message-Passing Graph Neural Networks," Data Mining and Knowledge Discovery, Nov. 17, 2022, 28 pages.

Dwivedi et al., "Benchmarking Graph Neural Networks," Journal of Machine Learning Research, Dec. 2022, 49 pages.

United States Patent and Trademark Office, "Notice of Allowance and Fee(s) Due," issued in connection with U.S. Appl. No. 17/345,940, mailed on Jul. 7, 2023, 8 pages.

United Kingdom Intellectual Property Office, "Intention to Grant under Section 18(4)," issued in connection with United Kingdom Patent Application No. 2112299.9, dated Jul. 13, 2023, 2 pages.

United States Patent and Trademark Office, "Non-Final Office Action," issued in connection with U.S. Appl. No. 17/710,538, mailed on Oct. 26, 2023, 6 Pages.

European Patent Office, "Extended European Search Report," issued in connection with European Patent Application No. 20891012.5, dated Nov. 17, 2023, 12 pages.

United States Patent and Trademark Office, "Notice of Allowance and Fee(s) Due," issued in connection with U.S. Appl. No. 18/476,978, dated Dec. 13, 2024, 11 pages.

United States Patent and Trademark Office, "Notice of Allowance and Fee(s) Due," issued in connection with U.S. Appl. No. 17/822,664, dated Dec. 31, 2024, 7 pages.

Gopal et al., "What is Intelligent Document Processing?" Nano Net Technologies, URL:[https://nanonets.com/blog/intelligent-document-processing/], Jul. 19, 2023, 21 pages.

United States Patent and Trademark Office, "Corrected Notice of Allowability," issued in connection with U.S. Appl. No. 17/345,940, mailed on Jul. 20, 2023, 3 pages.

International Searching Authority, "International Search Report," issued in connection with International Patent Application No. PCT/US2023/011859, mailed on Aug. 3, 2023, 3 pages.

International Searching Authority, "Written Opinion," issued in connection with International Patent Application No. PCT/US2023/011859, mailed on Aug. 3, 2023, 4 pages.

Canadian Intellectual Property Office, "Examiner's Report," issued in connection with Canadian Patent Application No. 3,124,868, dated Aug. 10, 2023, 5 pages.

United States Patent and Trademark Office, "Corrected Notice of Allowability," issued in connection with U.S. Appl. No. 17/883,309, mailed on Aug. 17, 2023, 2 Pages.

United Kingdom Intellectual Property Office, "Notification of Grant," issued in connection with United Kingdom Patent Application No. 2112299.9, dated Aug. 29, 2023, 2 pages.

Amazon, "Intelligent Document Processing," Amazon Web Services, https://aws.amazon.com/machine-learning/ml-use-cases/document-processing/fintech/, retrieved on Sep. 8, 2023, 6 pages.

United States Patent and Trademark Office, "Corrected Notice of Allowability," issued in connection with U.S. Appl. No. 17/075,675, mailed on Oct. 10, 2023, 2 pages.

United States Patent and Trademark Office, "Notice of Allowance and Fee(s) Due," issued in connection with U.S. Appl. No. 17/710,538, dated Sep. 11, 2024, 3 pages.

United States Patent and Trademark Office, "Non-Final Office Action," issued in connection with U.S. Appl. No. 17/710,649, dated Sep. 16, 2024, 12 pages.

United States Patent and Trademark Office, "Second Notice of Allowability," issued in connection with U.S. Appl. No. 18/191,642, dated Sep. 16, 2024, 2 pages.

United States Patent and Trademark Office, "Notice of Allowance and Fee(s) Due," issued in connection with U.S. Appl. No. 17/710,660, dated Sep. 25, 2024, 9 pages.

Bojanowski et al., "Enriching Word Vectors with Subword Information," In Journal Transactions of the Association for Computational Linwstics, 2017, vol. 5, pp. 135-146, 12 pages.

Vogel et al., "Parallel Implementations of Word Alignment Tool," Software Engineering, Testing, and Quality Assurance for Natural Language Processing, nn. 49-57, Jun. 2008, 10 pages.

Joulin et al., "Bag of Tricks for Efficient Text Classification," In Proceedings of the 15th Conference of the European Chapter of the Association for Computational Linguistics, Aug. 9, 2016, 5 pages.

Follmann et al., "MVTec D2S: Densely Segmented Supermarket Dataset". In European Conference on Computer Vision (ECCV), 2018, 17 pages.

Konda et al., "Magellan: Toward Building Entity Matching Management Systems Over Data Science Stacks," Proceedings of the VLDB Endowment, vol. 9, No. 13, pp. 1581-1584, 2016, 4 pages.

Genereux et al., "NLP Challenges in Dealing with OCR-ed Documents of Derogated Quality," Workshop on Replicability and Reproducibility in Natural Language Processing: adaptive methods,resources and software at IJCAI 2015, Jul. 2015, 6 pages.

Osindero et al., "Recursive Recurrent Nets with Attention Modeling for OCR in the Wild," in Conference on Computer Vision and Pattern Recollection (CVPR), 2016, 10 pages.

Nshuti, "Mobile Scanner and OCR (A First Step Towards Receipt to Spreadsheet)," 2015, 3 pages.

Wick et al., "Calamari—A High-Performance Tensorflow-based Deep Learning Package for Optical Character Recognition," Digital Humanities Quarterly, 2020, 12 pages. [retrieved from:https://arxiv.org/ftp/arxiv/papers/1807/1807.02004.pdf].

Github, "Tesseract OCR" Tesseract Repository on GitHub, 2020, 3 pages. [available online, https://github.com/tesseract-ocr/].

Smith et al., "Identification of Common Molecular Subsequences," Journal of Molecular Biology, Academic Press Inc. (London) Ltd., pp. 195-197, 1981, 4 pages.

Vaswani et al., "Attention is all you need," In Advances in Neural Information Processing Systems, 31st Conference on Neural Information Processing Systems (NIPS 2017), Long Beach, CA, last revised Dec. 6, 2017, 15 pages.

Levenshtein, "Binary Codes Capable of Correcting Deletions, Insertions, and Reversals," Soviet Physics—Doklady, Cybernetics and Control Theory, pp. 707-710, vol. 10, No. 8, Feb. 1966, 4 pages.

Govindan et al., "Character Recognition—A Review," Pattern Recognition, vol. 23, No. 7, pp. 671-683, Jul. 20, 1990, 13 pages.

Lowe, "Distinctive Image Features from Scale-Invariant Key points," International Journal of Computer Vision (HCV), Jan. 5, 2004, 28 pages.

Marinai, "Introduction to Document Analysis and Recognition," Machine Learning in Document Analysis and Recognition, 2008, 22 pages.

O'Goman et al., "Document Image Analysis," IEEE Computer Society Executive Briefings, 2009, 125 pages.

Krizhevsky et al., "ImageNet Classification with Deep Convolutional Neural Networks," In International Conference on Neural Information Processing Systems (NIPS), 2012, 9 pages.

Ronneberger et al., "U-Net: Convolutional Networks for Biomedical Image Segmentation, " Medical Image Computing and Computer-Assisted Intervention (MICCAI), May 18, 2015, 8 pages.

Lecun et al., "Deep Learning," Nature, vol. 521, pp. 436-444, May 28, 2015, 9 pages.

Kim et al., "Character-Aware Neural Language Models," Proceedings of the Thirtieth AAAI Conference on Artificial Intelligence (AAAI'IO), pp. 2741-2749, 2016, 9 pages.

Ren et al., "Faster R-CNN: Towards Real-Time Object Detection with Region Proposal Networks," In International Conference on Neural Information Processing Systems (NIPS), pp. 91-99, Jan. 6, 2016, 14 pages.

Redmon et al., "You Only Look Once: Unified, Real-Time Object Detection," In Conference on Computer Vision and Pattern Recognition (CVPR), May 9, 2016, 10 pages.

Ozhiganov et al., "Deep Dive Into OCR for Receipt Recognition," DZone, Jun. 21, 2017, 18 pages.

Bartz et at, "STN-OCT: A Single Neural Network for Text Detection and Text Recognition," Computer Vision and Pattern Recognition, Jul. 27, 2017, 9 pages.

Mudgal et al., "Deep Learning for Entity Matching: A Design Space Exploration," InProceedings of the 2018 International Conference on Management of Data, 2018, Houston, TX, 16 pages.

Ray et al., "U-PC: Unsupervised Planogram Compliance," in European Conference on Computer Vision (ECCV), 2018, 15 pages.

(56)     References Cited

OTHER PUBLICATIONS

[retrieved from:http:/ /openaccess.thecvf.com/content_ ECCV _ 2018/ papers/ Archan_Ray_ U-PC_Unsupervised Planogram ECCV 2018 paper.pdf].

Hui, "mAP (mean Average Precision) for Object Detection," Mar. 6, 2018. Retrieved from [https://medium.com/@jonathan hui/map-mean-average-precision-for-object-detection- 45c121a31173] on May 11, 2020, 2 pages.

Akbik et al., "Contextual String Embeddings for Sequence Labeling," In Proceedings of the 27th International Conference on Computational Linguistics (COLING), Aug. 2018, 12 pages.

Li et al., "Extracting Figures and Captions from Scientific Publications," Short Paper, CIKM18, Oct. 22-26, 2018, Torino, Italy, 4 pages.

Huang et al., "Mask R-CNN with Pyramid Attention Network for Scene Text Detection", arXiv:1811.09058v1, pp. 1-9, https://arxiv.org/abs/1811.09058, Nov. 22, 2018, 9 pages.

Wikipedia, "Precision & Recall," Dec. 17, 2018 revision, 12 pages.

Artificial Intelligence & Image Analysis, "Intelligent Automation Eliminates Manual Data Entry From Complex Documents," White Paper, accessed on Jan. 30, 2019, 3 pages.

Artificial Intelligence & Image Analysis, "Historic Document Conversion," Industry Paper, accessed on Jan. 30, 2019, 4 pages.

Devlin et al., "BERT: Pre-training of Deep Bidirectional Transformers for Language Understanding," In Conference of the North American Chapter of the Association for ComputationalLinguistics (NAACL-HLT), Jun. 24, 2019, 16 pages.

Qasim et al., "Rethinking Table Recognition using Graph Neural Networks," In Inernational Conference on Document Analysis and Recognition (ICDAR), Jul. 3, 2019, 6 pages.

Feng et al., "Computer vision algorithms and hardware implementations: A survey", Integration: the VLSI Journal, vol. 69, pp. 309-320, https://www.sciencedirect.com/science/article/pii/S0167926019301762, accepted Jul. 27, 2019, 12 pages.

Oliveira et al., "dhSegment: A generic deep-learning approach for document segmentation," In 16th International Conference on Frontiers in Handwriting Recognition (ICFHR), Aug. 14, 2019, 6 pages.

Zhong et al., "PubLayNet: largest dataset ever for document layout analysis," In International Conference on Document Analysis and Recognition (ICDAR), Aug. 16, 2019, 8 pages.

International Searching Authority, "International Search Report and Written Opinion," issued in connection with PCT application No. PCT/IB2019/000299 dated Dec. 23, 2019, 9 pages.

Zacharias et al., "Image Processing Based Scene-Text Detection and Recognition with Tesseract," arXiv (CoRR), Apr. 17, 2020, 6 pages. [retrieved from: https://arxiv.org/pdf/2004.08079.pdf].

Xu et al., "LayoutLM: Pre-training of Text and Layout for Document Image Understanding," in International Conference on Knowledge Discovery & Data Mining (SIGKDD), Jun. 16, 2020, 9 pages. [retrieved from: https://arxiv.org/pdf/1912.13318.pdf].

Yu et al., "PICK: Processing Key Information Extraction from Documents using Improved Graph Learning-Convolutional Networks," in International Conference on Pattern Recognition (ICPR), Jul. 18, 2020, 8 pages. [retrieved from: https://arxiv.org/pdf/2004.07464.pdf].

Arroyo et al., "Multi-label classification of promotions in digital leaflets using textual and visual information," Proceedings of the Workshop on Natural Language Processing in E-Commerce (EComNLP), pp. 11-20, Barcelona, Spain (Online), Dec. 12, 2020, 10 pages.

DeepDive, "Distant Supervision" 2021, 2 pages. [available online on Stanford University website, http://deepdive.stanford.cdu/distant_ supervision].

International Searching Authority, "International Search Report," mailed in connection with International Patent Application No. PCT/US2020/061269, on Mar. 11, 2021, 3 pages.

International Searching Authority, "Written Opinion of the International Searching Authority", issued in connection with International Patent Application No. PCT/US2020/061269, dated Mar. 11, 2021, 4 Pages.

United States Patent and Trademark Office, "Non-Final Office Action," issued in connection with U.S. Appl. No. 16/692,797, dated Mar. 16, 2021, 12 pages.

Google, "Detect Text in Images," Mar. 29, 2021, 16 pages. Retrieved from http://cloud.google.com/vision/docs/ocr.

Mexican Institute of Industrial Property, "First formal requirement report," issued in connection with Mexican Patent Application No. MX/a/2023/000642, dated Jan. 25, 2023, 20 pages. [Machine English Translation Included].

Mexican Institute of Industrial Property, "Formal examination and priority claim report," issued in connection with Mexican Patent Application No. MX/a/2023/000642, dated Jul. 7, 2023, 6 pages. [Machine English Translation Included].

Canadian Intellectual Property Office, "Conditional Notice of Allowance," issued in connection with Canadian Patent Application No. 3,124,868, dated Sep. 16, 2025, 3 pages.

United States Patent and Trademark Office, "Corrected Notice of Allowability," issued in connection with U.S. Appl. No. 18/176,273, dated Oct. 22, 2025, 3 pages.

Mexican Institute of Industrial Property, "Patent Certificate," issued in connection with Mexican Patent Application No. MX/a/2023/000642, dated Dec. 2, 2025, 115 pages. [Machine English Translation Included].

United States Patent and Trademark Office, "Notice of Allowance and Fee(s) Due," issued in connection with U.S. Appl. No. 18/148,928, dated Dec. 5, 2025, 8 pages.

United States Patent and Trademark Office, "Non-Final Office Action," issued in connection with U.S. Appl. No. 18/148,928, dated Aug. 4, 2025, 14 pages.

European Patent Office, "Communication pursuant to Article 94(3) EPC," issued in connection with European Patent Application No. 19921870.2, dated Sep. 8, 2025, 4 pages.

Mexican Patent Office, "Proceed to Grant," issued in connection with Mexican Patent Application No. MX/a/2023/000642, dated Sep. 25, 2025, 6 pages. [Machine English Translation Included].

United States Patent and Trademark Office, "Notice of Allowance and Fee(s) Due," issued in connection with U.S. Appl. No. 18/176,273, dated Oct. 7, 2025, 14 pages.

* cited by examiner

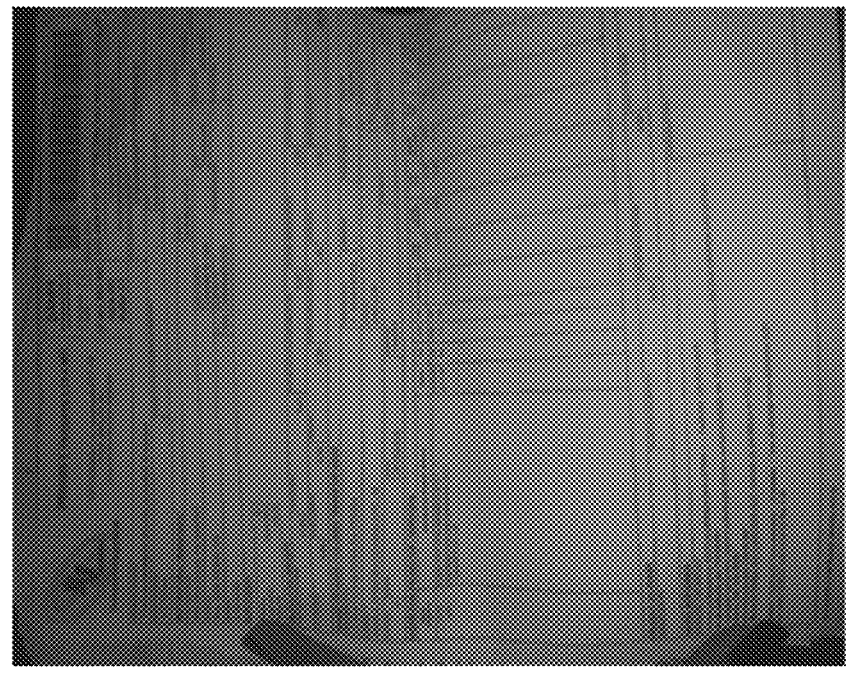
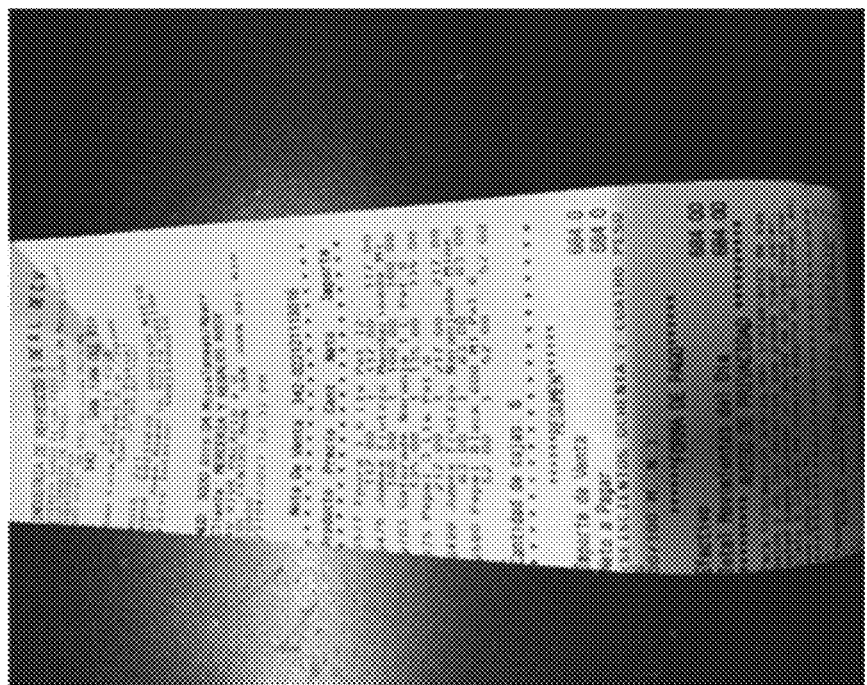
FIG. 1

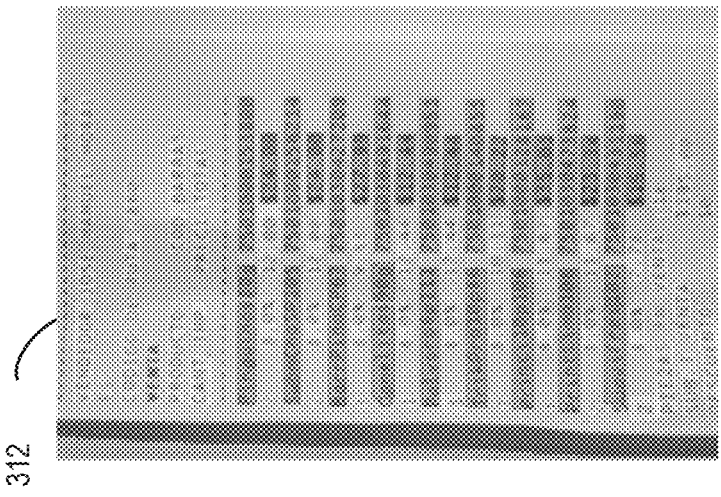
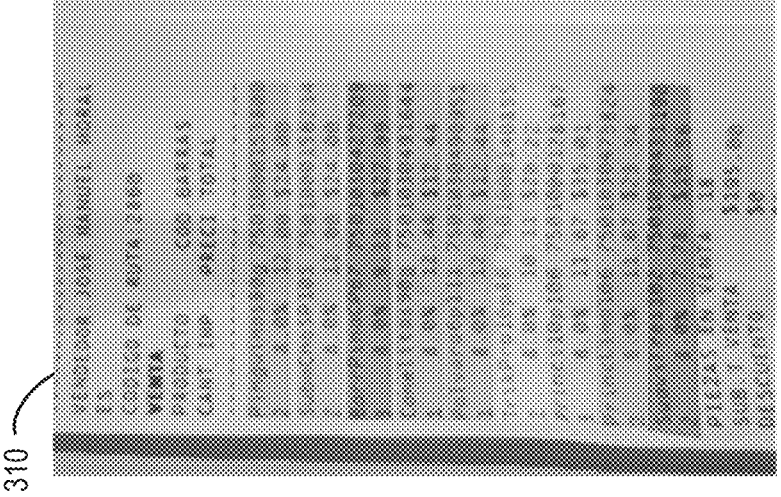
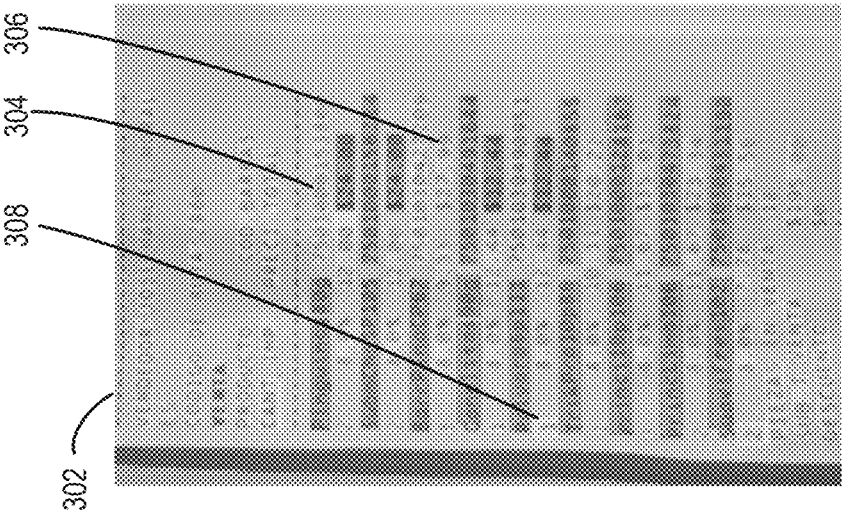
FIG. 3

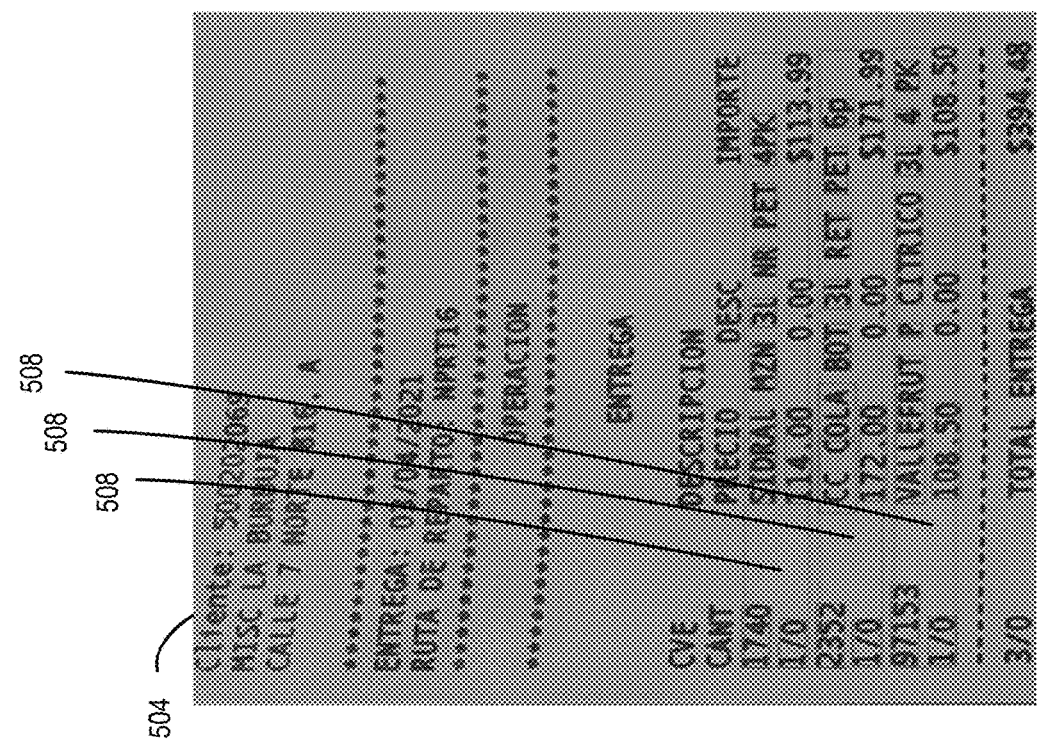
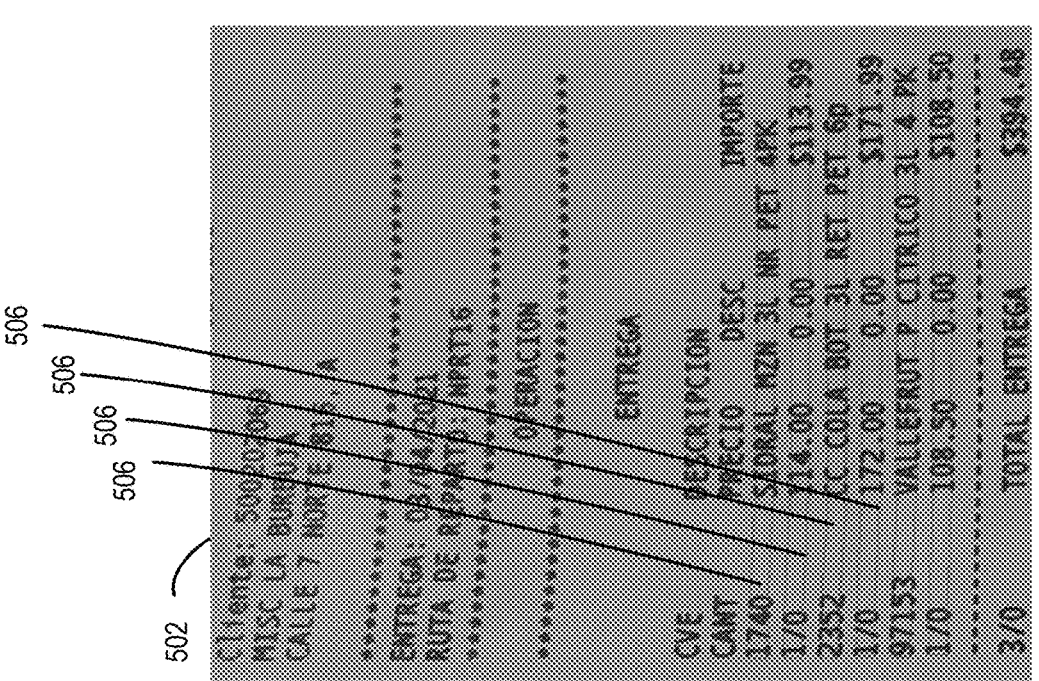
FIG. 5

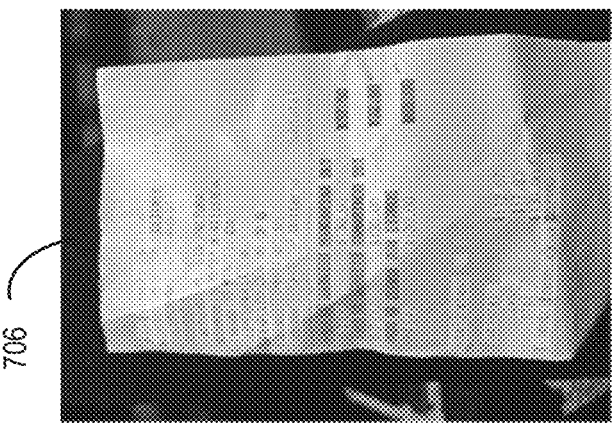
706

704
702
FIG. 7

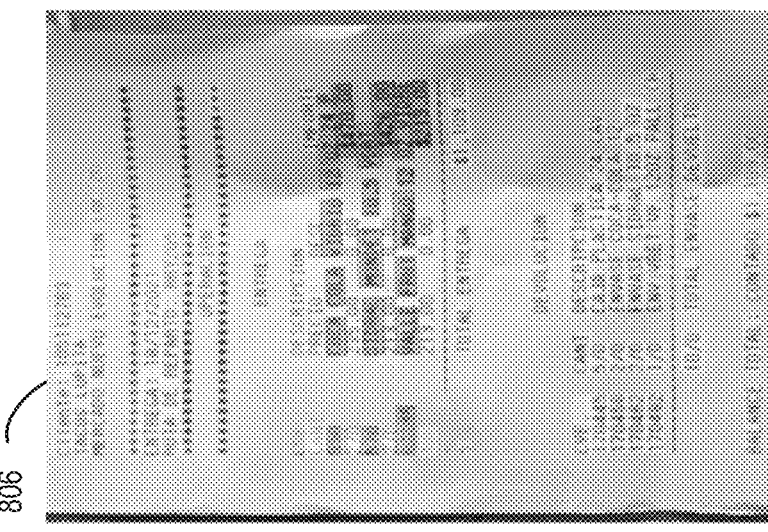
806
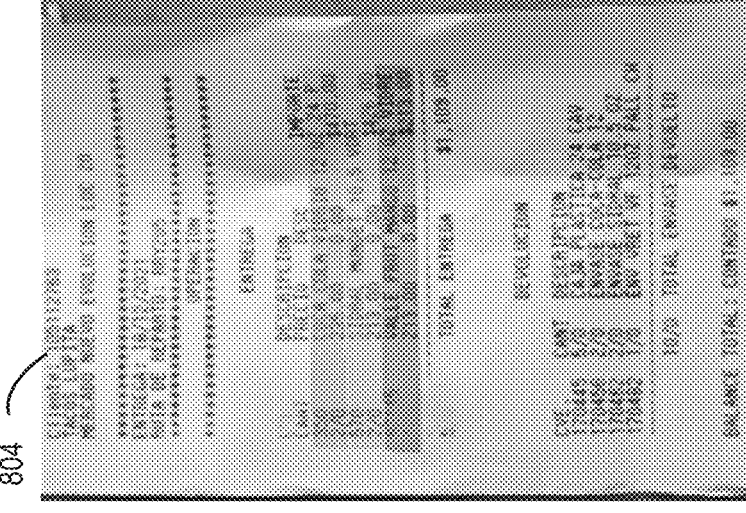
804
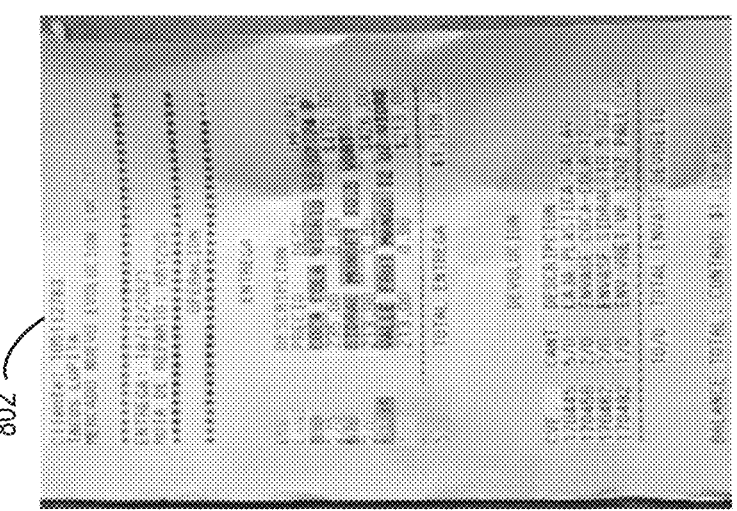
802
FIG. 8A

| | Accuracy November 2021 (Without post-processing) | Accuracy December 2021 (With post-processing) | Accuracy Enhancement (With post-processing) |
|---|---|---|---|
| Code | 44.20% | 67.90% | +23.70 |
| Description | 72.90% | 76.80% | +3.90 |
| Quantity | 79.70% | 83.10% | +3.40 |
| Price | 75.60% | 79.40% | +3.80 |
| Items | 26.50% | 41.90% | +15.40 |

Table 1

| | Accuracy November 2021 (Without post-processing) | Accuracy December 2021 (With post-processing) | Accuracy Enhancement (With post-processing) |
|---|---|---|---|
| Code | 58.90% | 69.40% | +10.50 |
| Description | 65.30% | 66.40% | +1.10 |
| Quantity | 56.90% | 69.00% | +12.10 |
| Price | 54.60% | 66.40% | +11.80 |
| Items | 24.20% | 35.10% | +10.90 |

Table 2

FIG. 8B

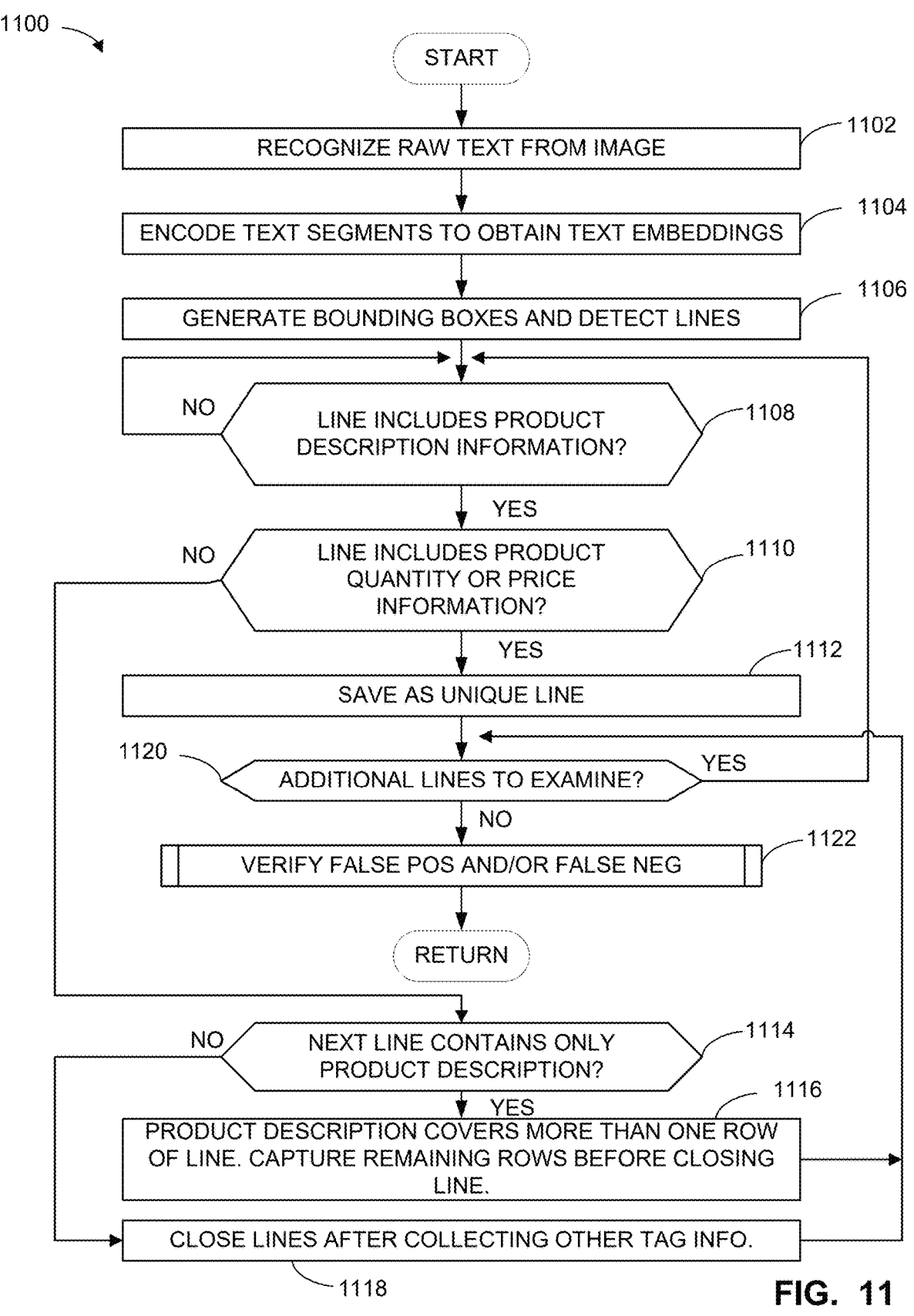

1100

START

RECOGNIZE RAW TEXT FROM IMAGE — 1102

ENCODE TEXT SEGMENTS TO OBTAIN TEXT EMBEDDINGS — 1104

GENERATE BOUNDING BOXES AND DETECT LINES — 1106

LINE INCLUDES PRODUCT DESCRIPTION INFORMATION? — 1108
NO

YES

LINE INCLUDES PRODUCT QUANTITY OR PRICE INFORMATION? — 1110
NO

YES

SAVE AS UNIQUE LINE — 1112

ADDITIONAL LINES TO EXAMINE? — 1120
YES

NO

VERIFY FALSE POS AND/OR FALSE NEG — 1122

RETURN

NEXT LINE CONTAINS ONLY PRODUCT DESCRIPTION? — 1114
NO

YES

PRODUCT DESCRIPTION COVERS MORE THAN ONE ROW OF LINE. CAPTURE REMAINING ROWS BEFORE CLOSING LINE. — 1116

CLOSE LINES AFTER COLLECTING OTHER TAG INFO. — 1118

FIG. 11

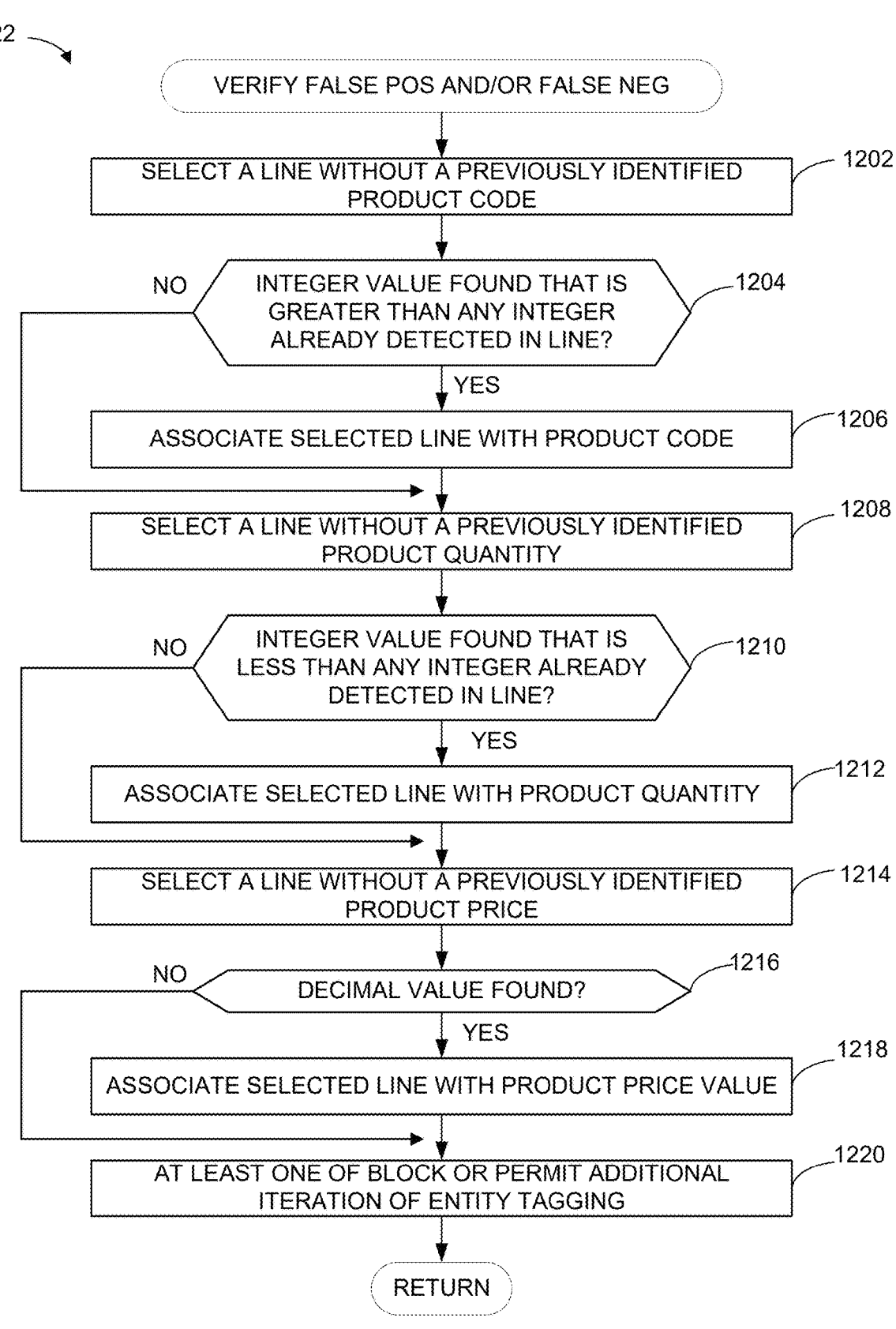

1122

VERIFY FALSE POS AND/OR FALSE NEG

SELECT A LINE WITHOUT A PREVIOUSLY IDENTIFIED PRODUCT CODE — 1202

INTEGER VALUE FOUND THAT IS GREATER THAN ANY INTEGER ALREADY DETECTED IN LINE? — 1204 — NO

YES

ASSOCIATE SELECTED LINE WITH PRODUCT CODE — 1206

SELECT A LINE WITHOUT A PREVIOUSLY IDENTIFIED PRODUCT QUANTITY — 1208

INTEGER VALUE FOUND THAT IS LESS THAN ANY INTEGER ALREADY DETECTED IN LINE? — 1210 — NO

YES

ASSOCIATE SELECTED LINE WITH PRODUCT QUANTITY — 1212

SELECT A LINE WITHOUT A PREVIOUSLY IDENTIFIED PRODUCT PRICE — 1214

DECIMAL VALUE FOUND? — 1216 — NO

YES

ASSOCIATE SELECTED LINE WITH PRODUCT PRICE VALUE — 1218

AT LEAST ONE OF BLOCK OR PERMIT ADDITIONAL ITERATION OF ENTITY TAGGING — 1220

RETURN

FIG. 12

METHODS, SYSTEMS, ARTICLES OF MANUFACTURE AND APPARATUS TO IMPROVE TAGGING ACCURACY

RELATED APPLICATION

This patent claims the benefit of Indian Provisional Patent Application No. 202211005270, which was filed on Jan. 31, 2022. Indian Provisional Patent Application No. 202211005270 is hereby incorporated herein by reference in its entirety. Priority to Indian Provisional Patent Application No. 202211005270 is hereby claimed.

FIELD OF THE DISCLOSURE

This disclosure relates generally to image recognition and, more particularly, to methods, systems, articles of manufacture and apparatus to improve tagging accuracy.

BACKGROUND

In recent years, optical character recognition (OCR) has been employed to extract text from images. In some examples, OCR techniques exhibit erroneous results.

BRIEF DESCRIPTION OF THE DRAWINGS

FIG. 1 illustrates example receipts and invoices to be processed in a manner consistent with this disclosure.

FIG. 3 illustrates example extractions using post-processing heuristics.

FIG. 5 illustrates example product line groupings.

FIG. 7 illustrates example product quantity corrections based on application of heuristics.

FIG. 8A illustrates example product price corrections based on application of heuristics.

FIG. 8B illustrates accuracy results based on application of examples disclosed herein.

FIGS. 11 and 12 are flowcharts representative of example machine readable instructions and/or example operations that may be executed by example processor circuitry to implement the example heuristics circuitry of FIG. 10.

In general, the same reference numbers will be used throughout the drawing(s) and accompanying written description to refer to the same or like parts. The figures are not to scale.

Figure 2:
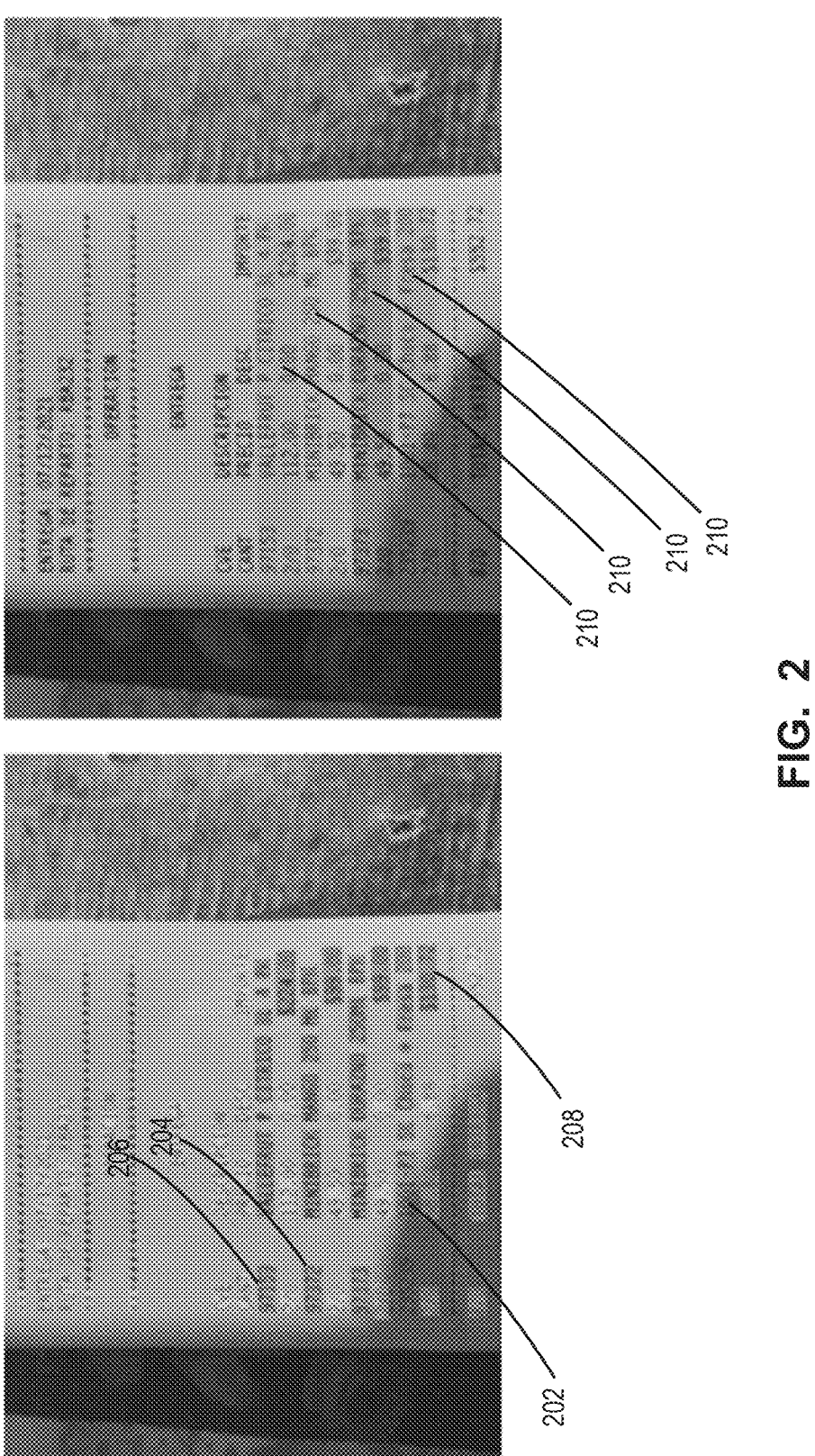
FIG. 2 illustrates example receipts and invoices that do not include errors.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUS, one or more DSPs, etc., and/or a combination thereof) and application programming interface(s) (API(s)) that may assign computing task(s) to whichever one(s) of the multiple types of processor circuitry is/are best suited to execute the computing task(s).

DETAILED DESCRIPTION

Text processing and understanding is a valuable asset for varied Artificial Intelligence (AI) systems. These technologies provide a business opportunity for retail and consumer measurement to automate data collection methods, operations and specific use cases in which it is required to decode documents or images with text.

Within the previous context, Computer Vision (CV) and Natural Language Processing (NLP) are two key areas of AI applied to solve document decoding problems. The popularization of Deep Learning (DL) during the last decade has provided powerful tools in CV and NLP to achieve competitive results in text recognition. Unfortunately, DL, CV, NLP and/or other techniques of machine learning (ML) (hereinafter referred to as "AI/ML") cannot always fully solve any problem or case by itself, so errors can appear in predictions during automated text processing in complex documents or images. In such circumstances, computing resources compensate for the possibility of error by allocating additional time to one or more problem solving tasks (e.g., text identification tasks) that result in energy consumption. In some examples, computing resources also generate excess heat in an effort to perform analysis tasks to a degree that meets one or more accuracy expectations, in which such excess heat must be managed by thermal management systems (e.g., refrigeration equipment in server facilities). To reduce (e.g., minimize) the error, energy and/or thermal impact of these common outlier cases, post-processing heuristics disclosed herein facilitate improvements to enhance the AI/ML outputs. Examples disclosed herein optimize available computing resources by applying post-processing techniques that exhibit relatively low computational costs when compared to AI/ML techniques. As such, rather than applying additional AI/ML techniques, post-processing techniques disclosed herein avoid inundating GPU, CPU and/or FPGA resources in a sustainable manner. Effects of examples disclosed herein provide improvements to the technical field of market research, and also facilitate improvements to computing resources to advance green energy initiatives.

Post-processing heuristics are disclosed herein for improving automated entity tagging in purchase documents. As used herein, "post-processing" represents activity and/or tasks that occur after AI/ML techniques are applied to extract entities from a document, which is referred to herein as "tagging." Some examples disclosed herein are focused on the decoding of entities (as used herein, "entities" refers to purchase facts from image data, which includes, but is not limited to price information, quantity information, product code information, product description information, etc.). Such approaches are included as a part of a Document Decoder Service (DDS), which may process varied types of document formats, such as receipts or invoices. At least one goal of the examples disclosed herein is to transform the manual data collection performed by auditors and to provide new tools to reduce this manual work. Auditors use handheld computing devices (e.g., Bluebird®) and similar devices (e.g., mobile/smart phones) to manually digitize data. Replacing auditors by storeowners involves engaging and incentivizing them apart from choosing the technical solution.

The purchase documents processed in examples disclosed herein contain rows of information related to the specific purchased products. Then, at least one other goal of the automation stage is to identify these product rows and associate the relevant information at item/product levels, particularly when some purchase documents include information for a single product spanning one or more rows of that purchase document. Examples disclosed herein identify information within each row (e.g., one or more rows of purchase document information are referred to as a line of the purchase document, such as a purchase receipt) that include entities such as the product description, the product code, the product quantity and the product price. To recognize these entities, examples disclosed herein employ AI/ML (e.g., NLP) defined methods such as entity tagging, which is able to learn the patterns of specific text entities and predict such text in unseen samples. However, entity tagging is not perfect in complex documents or images, so false positives and false negatives may appear within the set of predictions. Examples disclosed herein include some specific business rules for product descriptions, codes, quantities and prices that are applied in post-processing after the entity tagging stage, to enhance the accuracy of the system. Examples disclosed herein explain and describe these post-processing heuristics and how they can help in entity tagging corrections.

One of the techniques for retail and consumer measurement is the automated extraction of specific information from purchase documents, such as receipts and invoices. Typically, the information is collected by mobile devices in the form of handheld images (e.g., from an image capture device, such as a camera), as shown in the examples presented in FIG. 1. In some examples, the mobile apps include some features for user guidance and image capturing that help control the quality of the shots but with some limitations. There are several factors influencing the final appearance of the purchase document in the image and they have a non-negligible impact on the design and implementation of the automated extraction. Moreover, inherent variations in printing format and other defects of physical documents also contribute to accuracy of the acquired image data. A few challenges include, but are not limited to lighting conditions, shadowing effects, blurring, occluded regions, hand-written text or non-readable parts, among others. In the illustrated example of FIG. 1, an example receipt is shown on the left, and an example invoice is shown on the right. As mentioned above, the quality of these images captured by mobile phones and/or other image capture devices involves several challenges in the collection process.

The above-identified challenges cause a decrease in the effectiveness and efficiency of traditional manual decoding of product tags. Examples disclosed herein utilize artificial intelligence (AI) solutions to improve entity recognition and provide a degree of automation in the extraction of facts. Example architecture disclosed herein employ any type of AI/ML technique(s) (e.g., deep learning (DL)) and/or algorithms that extract information of interest from the collected purchase documents. In some examples, image information is processed via CV approaches, which are applied to obtain features or perform Optical Character Recognition (OCR) to read the text of interest. Generally speaking, NLP techniques are used to understand the text extracted by OCR and perform tasks associated with entity tagging.

In some examples, document decoding services disclosed herein extract item-level information from the lines contained in the purchase documents. As used herein, "lines" represent one or more rows of information in a document of interest (e.g., a receipt). Within these product lines, the targeted pieces of text (entities) include, but are not limited to different types of entities, such as a description (e.g., textual information about a specific product), a code (e.g., numerical identifier of a specific product), a quantity (e.g., total purchased units of the same product), and a price (e.g., total value of all the units from the same product).

Examples disclosed herein assign (tag) a semantic label (sometimes also referred to as a "tag") to a piece of text in a document for human understanding and interpretation. Examples disclosed herein train models to automatically detect and identify these entities. This is based on several AI techniques and DL algorithms. In some examples disclosed herein, data operations include taking pictures of the documents, uploading and storing pictures (e.g., in the cloud), forwarding the image(s) with metadata to DDS to extract (e.g., automatically) the information, select a percentage of the documents for manual revision and labeling of the correct entities using a front-end tool called labeling annotation platform (LAP, which is a tool to allow representation of auto coding predictions with a user interface), forward the information to other systems downstream for product matching, data cleaning, aggregation and reporting, and facilitating validation (e.g., by a labeling team) of automated detections and correct them as needed. The purpose is twofold: 1) calculate key performance indicators (KPIs) of the detections versus expected outcomes and 2) enhance the system by retraining DL-based models and other specific engineered improvements.

Unfortunately, entity tagging in view of the automated approaches described above can provide erroneous predictions, particularly in complex cases. In the illustrated example of FIG. 2, an example receipt tagging result is shown where all the product descriptions, codes, quantities and prices are completely identified without apparent errors. However, it is typical that entity tagging can miss some of the entities (false negatives) or mark words that do not correspond to an entity (false positives), as described further below. In such cases, some specific business rules for product descriptions, codes, quantities and/or prices can be applied in post-processing after the entity tagging stage, with the aim of enhancing the accuracy of the system and reducing unnecessary computational efforts and/or energy expenditure in re-tagging effort(s). As shown in the illustrated example of FIG. 2, examples of entity tagging (left) and product line grouping (right) in a receipt are captured. In particular, the illustrated example of FIG. 2 includes description entities 202, code entities 204, quantity entities 206 and price entities 208. Additionally, the right-hand side of FIG. 2 illustrates example lines 210 (e.g., groupings of two or more rows indicative of a same product).

As disclosed herein, post-processing techniques are applied to improve entity tagging output. As described in further detail below, examples disclosed herein illustrate an example manner of entity tagging output includes post-processing using heuristics to reduce false positive and false negative cases by analyzing product descriptions, product codes, product quantities and product prices.

The rise of DL has provided more powerful tools to the fields of CV and NLP. In the intersection between CV and NLP, OCR techniques commonly represent the starting point for recognizing the text contained in a document or image. Methods based on OCR examine images pixel by pixel, looking for shapes that match the character traits. The state of the art in OCR includes solutions that are open-source and/or proprietary. Tesseract® OCR is one of the most effective open-source approaches, with many users around the world. However, proprietary solutions such as Google® OCR are currently obtaining improved results in text recognition. Once the text contained in a document or image is recognized, document decoding systems typically need to understand certain parts or extract specific information. In this regard, the recent popularization of transformers in the NLP world has provided new tools for achieving the desired results. Generally speaking, transformers represent an NLP architecture that is based on neural networks for sequential models. In some examples, transformers rely on self-attention to compute representations of data input and output, and facilitates teaching neural networks for solving use cases related to text or image data (among others).

Among the different possibilities of text understanding, example decoding systems disclosed herein are generally focused on entity tagging, with the aim of extracting specific product information in purchase documents, such as product description, product code, product quantity and/or product price. Entity tagging is another state-of-the-art field that has been benefited by transformers. For instance, the architecture defined by PICK (Processing key Information extraction from documents using improved graph learning Convolutional networks) is typically used in example decoding systems disclosed herein for entity tagging, because its combination of transformers to get text embeddings and Convolutional Neural Networks (CNNs) to obtain image embedding provides one of the top performances in the recent literature. As described in further detail below, PICK is a framework that is focused on handling complex documents for Key Information Extraction (KIE), yielding a richer semantic representation containing textual and visual features.

Apart from entity tagging, entity linking is also required to match each entity (description, code, quantity and price) with each respective product in the purchase document. Here, state-of-the-art techniques such as SPADE (SPAtial DEpendency parser) propose end-to-end entity linking. However, examples disclosed herein use an approach based on two stages, including an initial entity tagging which is then linked by using line detection algorithms and heuristics. For line detection, recent GraphNN proposals show promising results.

Unfortunately, the state of the art does not consider many solutions for correcting wrong entity tagging predictions, which is something typical in complex documents. For this reason, examples disclosed herein include novel post-processing heuristics for improving automated entity tagging in purchase documents.

At least one objective of examples disclosed herein is to enhance automated entity tagging in purchase documents via post-processing heuristics based on, in part, business rules related to product description, code, quantity and price.

Initially, a brief discussion on how entity tagging works is described below, and why its accuracy for identifying some of the product facts is limited in cases like the ones depicted in the illustrated example of FIG. 3. Then, product line grouping is also discussed regarding how the predicted tagged entities are associated with their respective products, similarly to an entity linking approach. Post-processing heuristics is also disclosed, which is designed to correct entity tagging errors, as can be seen in the illustrated example of FIG. 3 from left to right. It must be noted that examples disclosed herein use purchase documents with a receipt-like layout to exemplify the process, but this post-processing is applicable to other formats such as tabular invoices. In particular, the illustrated example of FIG. 3 includes examples of the process for extracting improved entity tags with post-processing heuristics. In the illustrated example of FIG. 3, a first image 302 illustrates initial entity tagging with several codes, quantities and prices not detected, which are false negatives. For example, the first image 302 includes codes that have not been detected 304, prices that have not been detected 306, and quantities that have not been detected 308. The illustrated example of FIG. 3 also includes product line grouping based on line detection and heuristics 310, and results indicative of improved entity tags 312 after post-processing the initial ones with the heuristics that will be explained in detail in the following sections for product codes, quantities and prices.

As disclosed further below, an initial first step of entity tagging uses an out-of-the-box OCR technology to automatically recognize the raw text that is present in the image of the purchase document. The OCR output is used as input of the entity tagging architecture to predict the desired information after training a model, which in examples disclosed herein is done using labeled data. As described above, the PICK architecture (which is one example baseline entity tagging technique for testing example post processing disclosed herein, and examples are not limited thereto) is employed for initial entity tagging purposes. PICK is a framework that is focused on handling complex documents for Key Information Extraction (KIE), yielding a richer semantic representation containing textual and visual features. The overall architecture contains three phases. A first example phase is an encoder, which encodes text segments (obtained by OCR) using transformers to get text embeddings and image segments using CNN to get image embeddings. The text segments and image segments stand for textual and morphology information individually. A second example phase is a graph phase, which catches the latent relation between nodes and gets a richer graph embedding representation of nodes through improved graph learning convolutional operation. Bounding boxes containing layout context of the document are also modeled. A third example phase is a decoder, which performs sequence tagging on the union non-local sentence at character-level. The model transforms KIE tasks into a sequence tagging problem by considering the layout information and the global information of the document.

Figure 4:
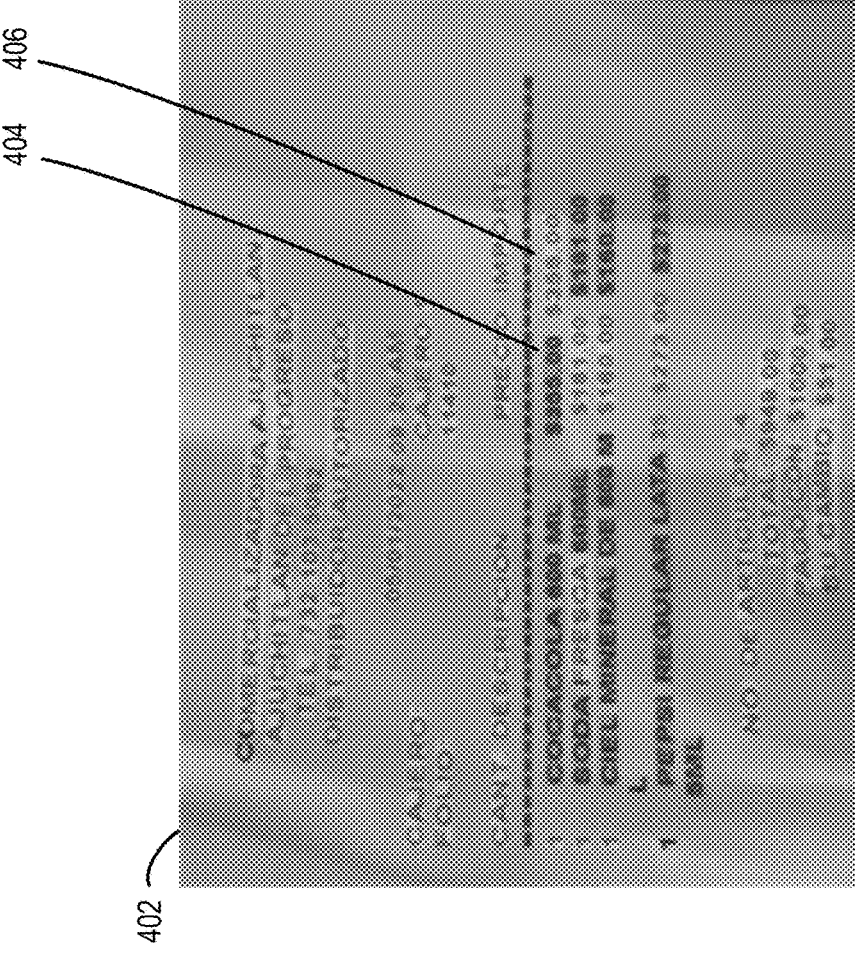
FIG. 4 illustrates example predictions that have been trained and include errors.

FIG. 4 illustrates examples of prediction output 402 (e.g., a receipt showing results of a tagging effort) for a PICK model trained using in-house data. As can be seen, some entities are missed or wrongly detected. For instance, in the illustrated example of FIG. 4, detected price entities 404 and undetected price entities 406 are included on the predictions 402. The goal of examples disclosed herein is to correct these issues using post-processing heuristics.

Once entities are initially recognized (tagged) for a purchase document, the entities are grouped by product. This entity linking is performed by applying a product line grouping technique. Firstly, the lines contained in the document are individually detected. To do this, a GraphNN is applied with the aim of connecting the different words previously extracted as tagged entities in a same line. GraphNN applies an architecture based on graph networks that combines the benefits of CNNs for visual feature extraction and graph networks for dealing with the document data structure.

As disclosed in further detail below, after detecting one or more individual lines, heuristics are applied to define the groups of lines corresponding to a same product, as illustrated in FIG. 5. In the illustrated example of FIG. 5, examples from product line grouping debug are shown. On the left image 502, one or more entities 506 are detected as individual lines (e.g., using GraphNN). On the right image 504, three example final product line groupings 508 are obtained by way of heuristics application and inputting the individual lines represented on the left image, as described in further detail below.

Before a more detailed description of heuristics application below, a general process first includes taking the first individual line detected (from top to down in Y axis) and checking if some entities for product description are available on it. If not, continue searching until a first line with a product description is detected. Second, once the line with product description entities is found, there are two options: (A) If the line also contains a product quantity or a product price (product codes are not always available according to business rules in purchase documents), all the information for the product is in the same individual line. In other words, the line includes a single row of the document (e.g., purchase receipt). Then, product line grouping matches with a unique line and can be saved individually. (B) If the line only contains description tags, go to a third step (below).

Third, check if the next row of the line contains another description or any other entity tag: (A) If there are descriptions but not any other tags, it means that product description covers more than one row of the line. Examples disclosed herein then search for the next entity until it finds a row of the line containing any other entity before closing the line. (B) If there are entities such as product quantity or product price, the group of rows of the line can be closed (the line can be closed). Then, examples disclosed herein take the previously accumulated rows for the current product and combines their bounding boxes to obtain the final product line grouping.

Fourth, examples disclosed herein search for the next individual line containing a product description and get back to the second step (above) to restart the product lines grouping for the next item.

This is one example implementation disclosed herein to apply post-processing heuristics for improving automated entity tagging in purchase documents. Examples disclosed herein correct the missed elements in the initial tagged entities (false negatives) and even the ones that are wrongly detected (false positives) to replace them with the correct ones. In some examples, descriptions are an initial approach to product line grouping heuristics as they are generally the most accurate in automation and usually contain several words. In post-processing heuristics, examples disclosed herein focus on entities that typically include only one word based on numbers, which are the most typical source of issues. These entities in purchase documents are mainly product codes, product quantities and product prices.

Figure 6:
FIG. 6 illustrates example product code corrections based on application of heuristics.

Product codes do not always appear as part of the product information in purchase documents. However, when they are included in product information, they are typically the highest integer number in a product line grouping, as can be seen in the example presented in FIG. 6. In the illustrated example of FIG. 6, product code corrections based on heuristics are shown. Images from left to right: 1) Initial entity tagging with all the product codes missed in prediction (see element 602). 2) Product line grouping results based on line detection and heuristics (see element 604). 3) Improved entity tagging results after post-processing the initial ones (see element 606) (see added product). In case the product code cannot be found with the initial automated entity tagging, re-checking occurs to determine if it is available by applying the following heuristics. First, check every product line grouping and review if product code was predicted in the initial entity tagging. Second, for the lines without a predicted code, search for the highest integer among the words that are not marked in the initial entity tagging as any other product fact. Third, if a highest integer is found and it is bigger than the minimum integer in that product line grouping, add it to the entity tagging list as product code.

Product quantities are another entity type in purchase documents that can be corrected in post-processing using heuristics. To do this, this value usually represents an integer number close to one. Then, examples disclosed herein search for the lowest integer number in a product line grouping, which may occur in case this entity type was not initially found with automated entity tagging, as depicted in the example shown in FIG. 7. In the illustrated example of FIG. 7, examples of product quantity correction based on heuristics is shown. In the images from left to right in FIG. 7, initial entity tagging with all the product quantities missed in prediction (see element 702). FIG. 7 also illustrates product line grouping based on line detection and heuristics (see element 704). Finally, FIG. 7 also illustrates improved entity tagging results after post-processing the initial ones (see added product quantities in yellow). The example post-processing strategy includes first checking every product line grouping and review if product quantity was predicted in the initial entity tagging. Second, for the lines without a predicted quantity, search for the lowest integer among the words that are not marked in the initial entity tagging as any other product fact. Third, if a lowest integer is found and it is lower than the maximum integer in that product line grouping, add it to the entity tagging list as product quantity.

Product prices are typically represented by decimal numbers. In some business cases, the total prices per product is searched, so it is expected to find the highest decimal number in these situations. Then, this business rule is used to correct product prices initially predicted by entity tagging, as shown in FIG. 8. In the illustrated example of FIG. 8, product price corrections based on heuristics is shown. In the example images of FIG. 8 from left to right, an initial entity tagging with all the product prices missed in prediction (see element 802), product line grouping based on line detection and heuristics is shown (see element 804), and an improved entity tagging result after post-processing the initial ones is shown as element 806, which includes added product prices. The post-processing strategy in this case includes first checking every product line grouping and review if product price was predicted in the initial entity tagging. Then, for the lines without a predicted price, search for the highest decimal number among the words that are not marked in the initial entity tagging as any other product fact. Finally, if a highest decimal is found, add it to the entity tagging list as product price.

During testing, the performance progress of any applied AI/ML solution is monitored. In this regard, some key performance indicators (KPIs) have been implemented to regularly check some quantitative results. The main KPIs defined include a document type (e.g., a number of documents divided into types, such as receipts or invoices), an image quality (e.g., a number of documents depending on quality and/or whether the categories are readable, partially readable and not readable), and accuracy (e.g., performance metric used for individual entity types (code, description, quantity, price)). In some examples, there is also a metric for the combination of all entity types in the proper product grouping line (item).

After the initial testing focused on improving AI/ML algorithms, subsequent tests may be conducted in which the post-processing improvements previously explained are added. A noticeable enhancement in all KPIs was observed after adding these heuristics, as shown in Tables 1 and 2 for Mexico and Brazil purchase documents, respectively, which are shown in FIG. 8B.

Some post-processing heuristics disclosed herein improve the accuracy of automated entity tagging in purchase documents. Examples disclosed herein provide a number of contributions with respect to the state of the art in document decoding techniques. According to the definitions provided above, several beneficial aspects include combining techniques from CV and NLP worlds. This fusion of features provides a robust combination of visual and textual elements with the aim of achieving an acceptable performance even in complex purchase documents.

Examples disclosed herein facilitate entity linking and product line grouping by associating related entities for a same group of elements. Commonly, state-of-the-art solutions combine entity tagging and linking in a same end-to-end method, such as SPADE. However, examples that decouple tagging and linking based on heuristics allows easier post-processing to correct AI/ML errors that current techniques fail to consider.

Past efforts in document decoding typically focus on AI processing, but there are not remarkable references in the literature about how to perform post-processing to improve entity tagging automated processes. Examples disclosed herein, based on heuristics from business rules in purchase documents, correct errors for entities such as product codes, quantities, and prices. The presented results demonstrate its effectiveness in use cases, providing improvements among 10-15% in items accuracy depending on the country of origin from the documents analyzed. Of course, these kinds of post-processing heuristics can be scaled to other product entity types, languages, formats, etc.

The independence between AI/ML techniques and heuristics facilitates the best of both approaches. Current state-of-the-art approaches are typically focused on AI/ML, forgetting sometimes that heuristics can help to improve results. However, if the solution only trusts heuristics, issues when generalizing typically occur. Then, the innovation of techniques disclosed herein also resides in the combination of both strategies.

Figure 9:
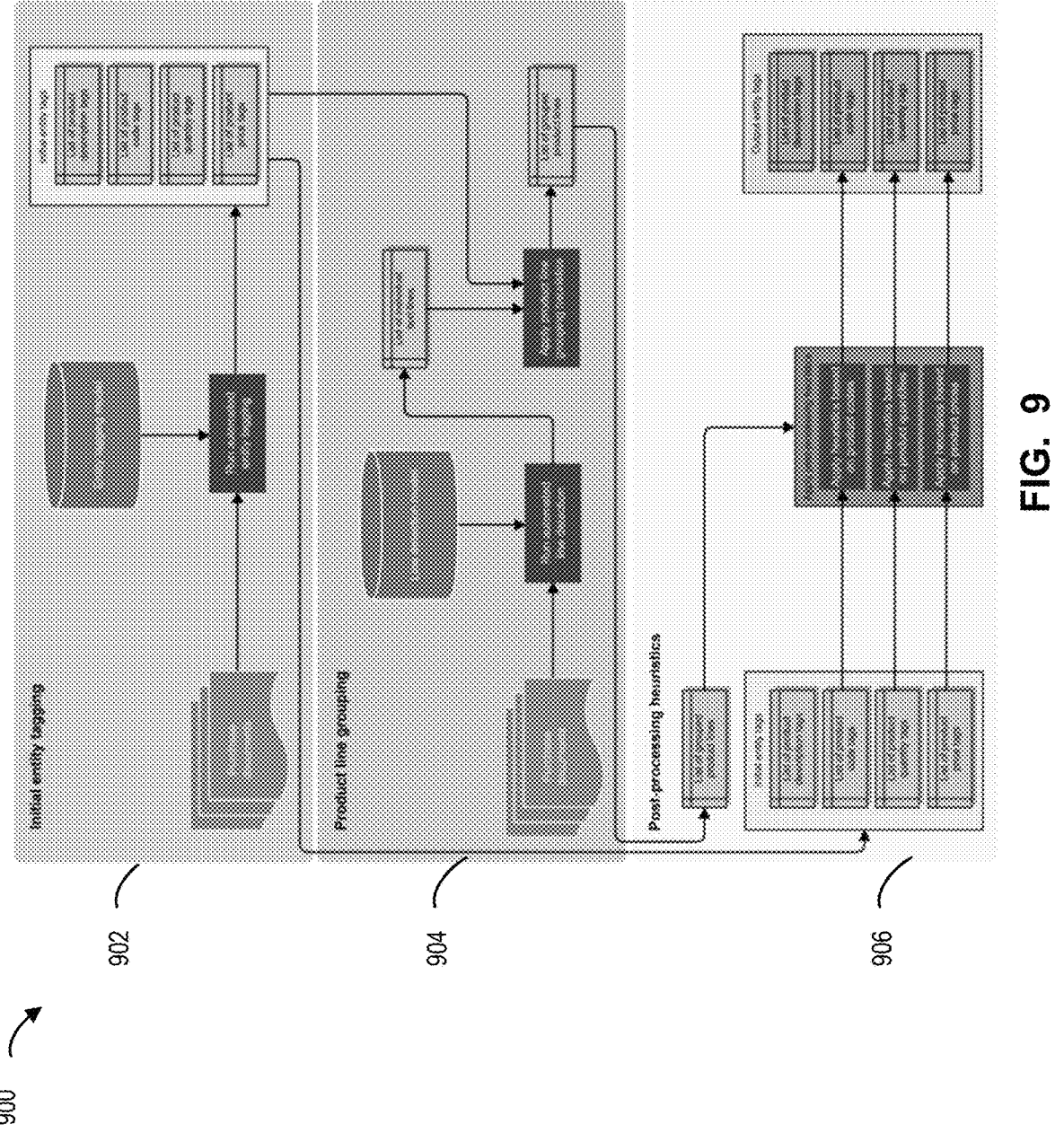
FIG. 9 illustrates a block diagram of an example system structured to improve tagging in purchase documents.

The diagram in FIG. 9 illustrates an overall framework 900 of the solution in post-processing heuristics for improving automated entity tagging in purchase documents. In the illustrated example of FIG. 9, a first phase includes initial entity tagging 902 to perform entity tagging on documents (e.g., purchase documents) using models. Results of the application of such models produces initial detected entity types, which are valuable aids when later applying heuristics to group rows of a purchase document to form product lines, as shown in an example second phase of product line grouping 904. As described above and in further detail below, an example third phase includes post-processing heuristics 906 to reduce false negatives and/or false positives that arise from isolated reliance upon AI/ML techniques when detecting entities. Additionally, because the example framework 900 includes post-processing heuristics, as described above and in further detail below, unnecessary re-iterations of entity tagging and/or product line grouping can be avoided, thereby conserving energy consumption and heat generation.

In general terms, examples disclosed herein are applicable to any use cases in which the input of the system are documents or images with text that must be tagged into different categories. In this regard, panel modernization (e.g., alternate use cases) can also directly benefit from the examples presented herein. Examples disclosed herein also work with receipts or purchase invoice documents or images. Similar entities are also used in codification, so the presented post-processing techniques could be scaled to these examples.

Leaflets coding is a use case that could also take advantage of the post-processing heuristics examples disclosed herein. Typically, leaflets also contain similar information about product descriptions, codes, quantities, prices or similar entities. Then, the approach described for correcting these kinds of entities can also be useful. In addition, item coding based on images is another use case in which the described approach can be applied. Here, the attributes coded from images are typically related to text descriptions. Some examples of categories processed in item coding are ingredients of a product, nutritional facts, pack size, addresses, etc. The described method can help to improve the categorization of these attributes and correct false negatives and false positives.

Focusing on the results presented for examples disclosed herein, improvements observed include a 10-15% in item-level accuracy depending on the country of origin from the documents analyzed. Individual tagging accuracy is now among 70-80%, which are very good numbers for automation. The accuracy for items (which means that all tagged entities, product linking and OCR text are perfect) is among 35-40%, which are acceptable numbers considering that these products do not need to be reviewed by manual annotators and supposes an interesting degree of automation. Additional observations include that if OCR was perfectly detected, the items accuracy could be also close to 70-80%.

Figure 10:
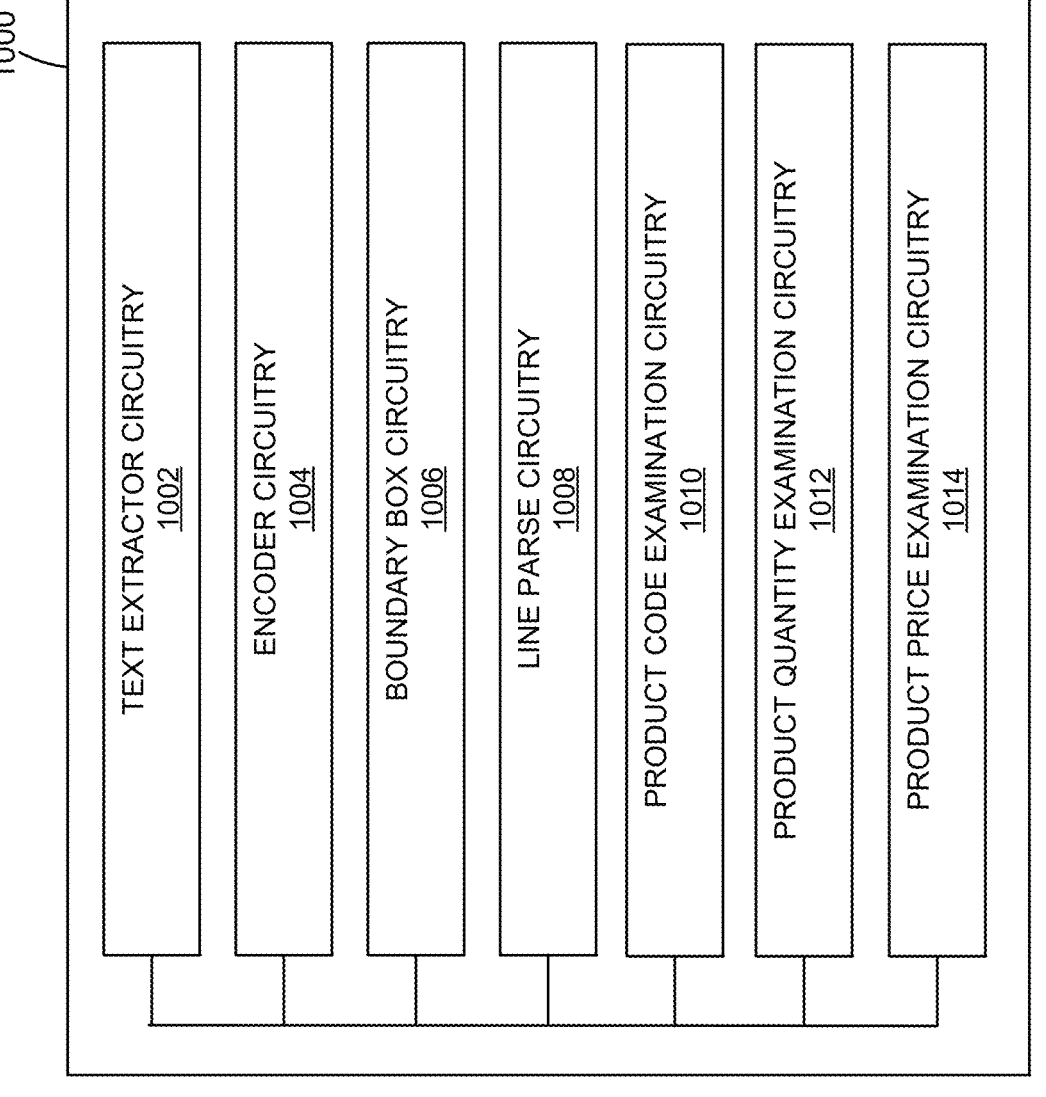
FIG. 10 is a block diagram of example heuristics circuitry to improve entity tagging in purchase documents.

FIG. 10 is a schematic illustration of example heuristic circuitry 1000 structured in a manner to improve tagging. In the illustrated example of FIG. 10, the heuristic circuitry 1000 includes example text extractor circuitry 1002, example encoder circuitry 1004, example bounding box circuitry 1006, example line parse circuitry 1008, example product code examination circuitry 1010, example product quantity examination circuitry 1012, and example product price examination circuitry 1014.

In operation, the example text extractor circuitry 1002 recognizes raw text from an image, and the example encoder circuitry 1004 encodes text segments to obtain text embeddings. The example boundary box circuitry 1006 generates bounding boxes and detects lines, and the example line parse circuitry 1008 searches for a line having at least product description information. When found, the example line parse circuitry 1008 determines if a detected line contains product quantity information or product price information. If so, the example line parse circuitry 1008 saves this information as a unique line. In particular, in this circumstance the line will contain product description information and at least one (or both) of product quantity information and/or product price information. The line parse circuitry 1008 saves this particular line so that subsequent heuristic analysis can occur, as described above and in further detail below.

In the event the example line parse circuitry 1008 determines that a particular line does not include at least one (or both) of product quantity information and/or product price information, then the line parse circuitry 1008 considers whether the next/subsequent line contains only description information. Stated differently, this additional check on the subsequent line allows the forward thinking possibility that more than one row of information is associated with a same product. In that case, the example line parse circuitry 1008 determines that multiple rows of the document correspond to a particular product, and examines subsequent rows to acquire all remaining data related to that product. Again, this line contains multiple rows and is saved for further heuristic analysis, as described in further detail below.

However, if the line contains only description information, but does not include price and/or quantity information, then the line is saved before closing the line and moving on to detect additional lines, if any. When all lines of a particular document have been analyzed to determine which combinations of (a) description entities, (b) quantity entities and/or (c) code entities, the example heuristic circuitry 1000 improves the entity identification accuracy by confirming whether there are false positives and/or false negatives. In particular, the example product code examination circuitry 1010 selects one of the previously examined lines that does not already have a confirmed product code detected therein. Stated differently, state-of-the-art AI/ML tag identification techniques may fail to detect such information during an initial analysis iteration. The product code examination circuitry 1010 determines whether the selected line includes an integer value that is greater than an already detected integer within that line. If so, this circumstance is indicative of a product code that prior ML/AI techniques failed to identify and the product code examination circuitry 1010 associates that selected line with the newly discovered product code information.

After identifying a missing product code, or after determining that there is no qualifying integer (e.g., that is greater than an already detected integer within that line), the example product quantity examination circuitry 1012 selects one of the previously examined lines that does not already have a confirmed product quantity entity type detected therein. Stated differently, state-of-the-art AI/ML entity identification techniques may have failed to detect such information during an initial analysis iteration. The product quantity examination circuitry 1012 determines whether the selected line includes an integer value that is less than an already detected integer value for the selected line. If so, this circumstance is indicative of a product quantity that prior ML/AI techniques failed to identify, and the product quantity examination circuitry 1012 associates that selected line with the newly discovered product quantity information.

After identifying a missing product quantity, or after determining that there is no qualifying integer (e.g., that is less than an already detected integer value of the selected line), the example product price examination circuitry 1014 selects one of the previously examined lines that does not already have a confirmed product price entity type detected therein. Stated differently, state-of-the-art AI/ML tag identification techniques may have failed to detect such information during an initial analysis iteration. The product price examination circuitry 1014 determines whether the selected line includes a decimal value. If so, this circumstance is indicative of a product price, and the produce price examination circuitry 1014 associates that selected line with the newly discovered product price information.

As described above, FIG. 10 is a block diagram of heuristic circuitry 1000 to perform post OCR/AI/ML heuristic analysis on captured document data. The example heuristic circuitry 1000 of FIG. 10 may be instantiated (e.g., creating an instance of, bring into being for any length of time, materialize, implement, etc.) by processor circuitry such as a central processing unit executing instructions. Additionally or alternatively, the heuristic circuitry 1000 of FIG. 10 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 10 may, thus, be instantiated at the same or different times. Some or all of the circuitry may be instantiated, for example, in one or more threads executing concurrently on hardware and/or in series on hardware. Moreover, in some examples, some or all of the circuitry of FIG. 10 may be implemented by microprocessor circuitry executing instructions to implement one or more virtual machines and/or containers.

In some examples, the text extractor circuitry 1002, the encoder circuitry 1004, the boundary box circuitry 1006, the line parse circuitry 1008, the product code examination circuitry 1010, the product quantity examination circuitry 1012, the product price examination circuitry 1014 and/or the heuristic circuitry 1000 is instantiated by processor circuitry executing respective text extractor instructions, encoder instructions, boundary box instructions, line parse instructions, product code examination instructions, product quantity examination instructions, product price examination instructions and/or heuristics instructions and/or configured to perform operations such as those represented by the flowcharts of FIGS. 11 and 12.

In some examples, the text extractor circuitry 1002 includes means for extracting text, the encoder circuitry 1004 includes means for encoding, the boundary box circuitry 1006 includes means for boundary boxing, the line parse circuitry 1008 includes means for parsing lines, the product code examination circuitry 1010 includes means for examining product codes, the product quantity examination circuitry 1012 includes means for examining product quantities, the product price examination circuitry 1014 includes means for examining product price, and the heuristics circuitry 1000 includes means for applying heuristics. For example, the means for extracting text may be implemented by the text extractor circuitry 1002, the means for encoding may be implemented by the encoder circuitry 1004, the means for boundary boxing may be implemented by the boundary box circuitry 1006, the means for parsing lines may be implemented by the line parse circuitry 1008, the means for examining product codes may be implemented by the product code examination circuitry 1010, the means for examining product quantities may be implemented by the product quantity examination circuitry 1012, the means for examining product price may be implemented by the product price examination circuitry 1014, and the means for encoding may be implemented by the encoding circuitry 1000. In some examples, the aforementioned circuitry may be instantiated by processor circuitry such as the example processor circuitry 1312 of FIG. 13. For instance, the aforementioned circuitry may be instantiated by the example microprocessor 1400 of FIG. 14 executing machine executable instructions such as those implemented by the blocks of FIGS. 11 and 12. In some examples, the aforementioned circuitry may be instantiated by hardware logic circuitry, which may be implemented by an ASIC, XPU, or the FPGA circuitry 1500 of FIG. 15 structured to perform operations corresponding to the machine readable instructions. Additionally or alternatively, the aforementioned circuitry may be instantiated by any other combination of hardware, software, and/or firmware. For example, the aforementioned circuitry may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

While an example manner of implementing the heuristic circuitry 1000 of FIG. 10 is illustrated in FIGS. 1-10, one or more of the elements, processes, and/or devices illustrated in FIG. 10 may be combined, divided, re-arranged, omitted, eliminated, and/or implemented in any other way. Further, the example text extractor circuitry 1002, the example encoder circuitry 1004, the example boundary box circuitry 1006, the example line parse circuitry 1008, the example product code examination circuitry 1010, the example product quantity examination circuitry 1012, the example product price examination circuitry 1014, and/or, more generally, the example heuristic circuitry 1000 of FIG. 10, may be implemented by hardware alone or by hardware in combination with software and/or firmware. Thus, for example, any of the example text extractor circuitry 1002, the example encoder circuitry 1004, the example boundary box circuitry 1006, the example line parse circuitry 1008, the example product code examination circuitry 1010, the example product quantity examination circuitry 1012, the example product price examination circuitry 1014, and/or, more generally, the example heuristic circuitry 1000 of FIG. 10, could be implemented by processor circuitry, analog circuit(s), digital circuit(s), logic circuit(s), programmable processor(s), programmable microcontroller(s), graphics processing unit(s)

(GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example heuristic circuitry 1000 of FIG. 10 may include one or more elements, processes, and/or devices in addition to, or instead of, those illustrated in FIG. 10, and/or may include more than one of any or all of the illustrated elements, processes and devices.

Flowcharts representative of example machine readable instructions, which may be executed to configure processor circuitry to implement the heuristic circuitry 1000 of FIG. 10, are shown in FIGS. 11-12. The machine readable instructions may be one or more executable programs or portion(s) of an executable program for execution by processor circuitry, such as the processor circuitry 1312 shown in the example processor platform 1300 discussed below in connection with FIG. 13 and/or the example processor circuitry discussed below in connection with FIGS. 14 and/or 15. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 11 and 12, many other methods of implementing the example heuristic circuitry 1000 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 11 and 12 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 11 is a flowchart representative of example machine readable instructions and/or example operations 1100 that may be executed and/or instantiated by processor circuitry to improve the accuracy of document entity identification and product matching previously attempted by one or more ML/AI techniques. Additionally, because examples disclosed herein improve the accuracy of entity identification after an initial AI/ML iteration, subsequent AI/ML iterations to improve accuracy are avoided, thereby reducing computationally intensive efforts that consume additional energy and/or generate additional heat that would otherwise require thermal management efforts. The machine readable instructions and/or the operations 1100 of FIG. 11 begin at block 1102, at which the example text extractor circuitry 1002 recognizes raw text from an image, and the example encoder circuitry 1004 encodes text segments to obtain text embeddings (block 1104). The example boundary box circuitry 1006 generates bounding boxes and detects lines (block 1106), and the example line parse circuitry 1008 searches for and/or otherwise identifies a line having at least product description information (block 1108). In some examples, tasks associated with blocks 1102 through 1106 are performed by one or more AI/ML services that search for and/or otherwise identify and store entities from any number of documents (e.g., purchase receipts). Entities may be stored in storage devices, such as databases, disk drives, memory and/or other types of storage (e.g., cloud storage). As such, one or more operations after example block 1106 may occur after data acquisition efforts have completed. In the event prior data collection efforts have occurred to acquire (tag) entity data from documents, and such data is stored in any type of storage device, example interface circuitry 1320 retrieves such information to facilitate a heuristic analysis of the acquired entity information, as described in further detail below.

When product description(s) (e.g., a first type of entity) is/are found, the example line parse circuitry 1008 determines if a detected line contains a second type of entity (e.g., product quantity information and/or product description information) (block 1110). As discussed above, in this circumstance the line will contain product description information and at least one (or both) of product quantity information and/or product price information. As such, the example line parse circuitry 1008 saves this information as a unique line (block 1112) for future heuristic analysis. If no product quantity information and/or product description information is detected (block 1110) in the line or the first row of the line, the example line parse circuitry 1008 searches for and/or otherwise checks the next/subsequent line to determine whether it contains only description information (block 1114). If so, the example line parse circuitry 1008 determines that multiple rows of a line correspond to a particular product (block 1116), and examines subsequent rows of the line to acquire all remaining data related to that product. However, if the line is determined to have no further description information on a next (adjacent) row and/or include no product quantity or price information, this circumstance suggests one or more errors have occurred in entity tagging performed by a prior process (e.g., one or more AI/ML processes). Alternatively, if the next (e.g., adjacent) analyzed line contains an alternate description, that next line may be associated with a completely different product, which indicates that the initial analyzed line contains only a description, but not other information. This circumstance is indicative of a potential error by the preceding AI/ML entity tagging process(es), for which heuristic analysis can correct. In other words, when at least one line includes description information, but fails to include and/or is otherwise missing a second type of entity (e.g., price information, quantity information, or code information (or other entity types)), then this situation is unexpected for purchase documents and suggest entity tagging failures/anomalies. However, post processing heuristics disclosed herein correct for such errors. The line may be flagged for further review via heuristics, in some examples. As such, the remainder of that line is saved along with any number of other entities before closing the line and moving on to detect additional lines, if any (block 1118).

In the illustrated example of FIG. 11, in the event the example line parse circuitry 1008 determines that there are additional rows of the document of interest to analyze (block 1120), then the program returns to block 1108. On the other hand, when the line parse circuitry 1008 determines that there are no further lines of the document to analyze (block 1120), the example heuristic circuitry 1000 analyzes the lines to verify whether one or more false negatives and/or false positives exist (block 1122).

FIG. 12 illustrates additional detail corresponding to block 1122 of FIG. 11. In the illustrated example of FIG. 12, the product code examination circuitry 1010 selects one of the previously identified lines that does not include a product code (block 1202) and examines that line for an integer value that is greater than any integer value that may have been already detected in that line (block 1204). In the event an integer value is found that is greater than any previously identified integer value (block 1204), this circumstance is indicative of a product code, and the example product code examination circuitry 1010 associates the selected line with the identified product code (block 1206).

The example product quantity examination circuitry 1012 selects one of the previously identified lines that does not include a previously identified product quantity (block 1208) and examines that line for an integer value that is less than any integer value that may have been already (previously) detected in that line (block 1210). In the event an integer value is found that is less than any previously identified integer value (block 1210), this circumstance is indicative of a product quantity, and the example product quantity examination circuitry 1012 associates the selected line with the identified product quantity (block 1212).

The example product price examination circuitry 1014 selects one of the previously identified lines that does not include a previously identified product price (block 1214) and examines that line for a decimal value (block 1216). In the event a decimal value is found (block 1216), this circumstance is indicative of a product price, and the example product price examination circuitry 1014 associates the selected line with the identified product price (block 1218).

In some examples, the heuristic circuitry 1000 determines whether a threshold number of entities has been identified for a particular line and/or number of rows of the document of interest. In some cases, the example heuristic circuitry 1000 blocks an attempt to repeat additional iterations of entity tagging when a threshold number of entities has been identified on the document of interest, and/or whether at least one set of entity combinations has been identified for every row/line of the document of interest (block 1220). For instance, if each line of the document of interest includes a product description, a product quantity, a product code and a product price, then the example heuristic circuitry 1000 blocks an attempt to re-initiate further entity tagging based on adequate information acquired via prior AI/ML entity tagging efforts and/or corrections realized by the heuristic analysis of FIG. 12. Stated differently, examples disclosed herein block attempts to re-initiate further entity tagging (block 1220) in an effort to conserve computational resource operations in a manner deemed wasteful (e.g., due to a default protocol to automatically conduct a particular number of iterations of entity tagging). In other examples, the heuristic circuitry 1000 permits the execution of additional entity tagging efforts (block 1220) in the event insufficient (e.g., less than a threshold number) entity types are identified on the document of interest (e.g., one or more lines/rows missing description entities, code entities, quantity entities and/or price entities).

Figure 13:
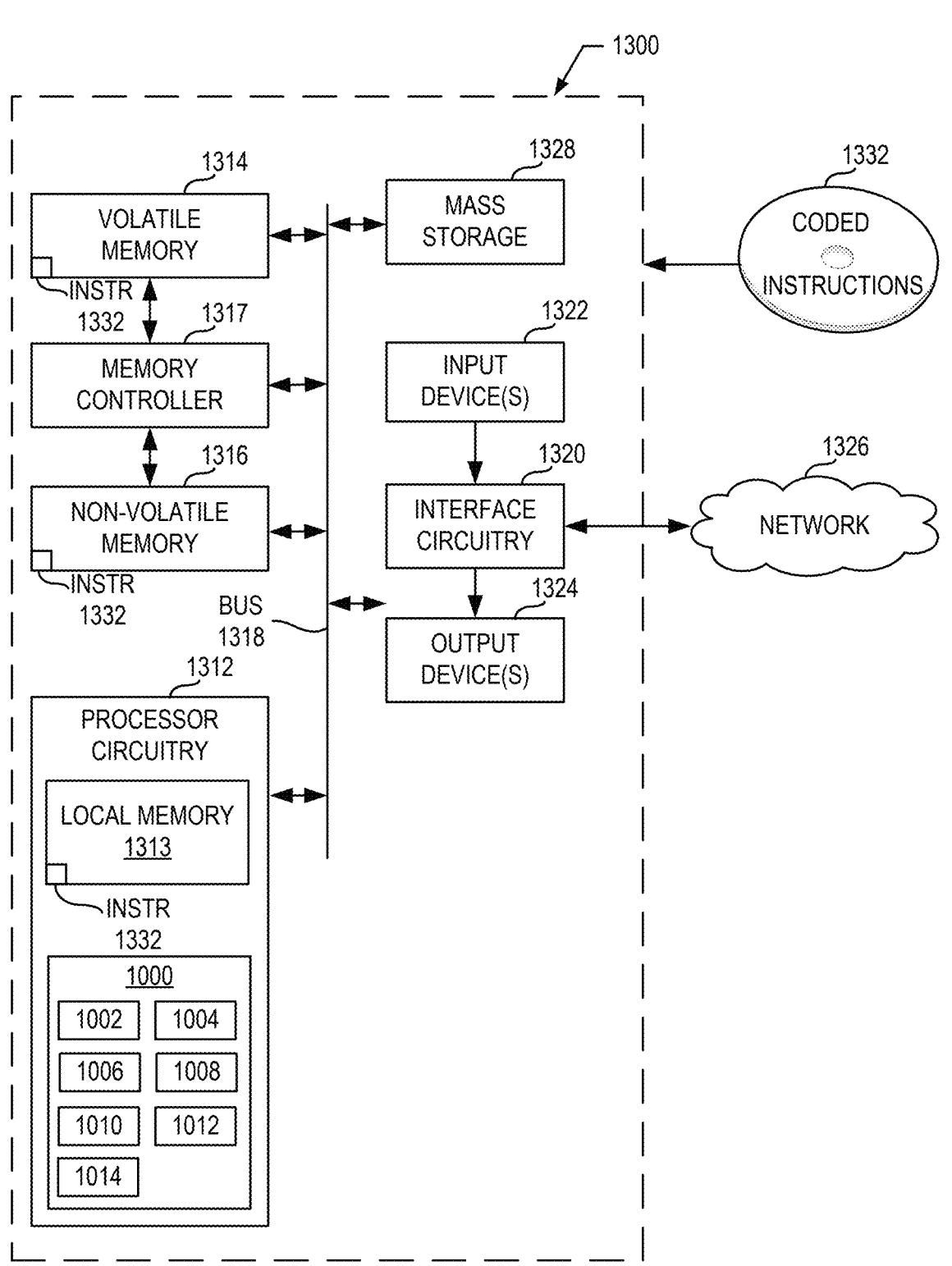
FIG. 13 is a block diagram of an example processing platform including processor circuitry structured to execute the example machine readable instructions and/or the example operations of FIGS. 11 and 12 to implement the heuristics circuitry of FIG. 10.

FIG. 13 is a block diagram of an example processor platform 1300 structured to execute and/or instantiate the machine readable instructions and/or the operations of FIGS. 11 and 12 to implement the heuristic circuitry 1000 of FIG. 10. The processor platform 1300 can be, for example, a server, a personal computer, a workstation, a self-learning machine (e.g., a neural network), a mobile device (e.g., a cell phone, a smart phone, a tablet such as an iPad™), an Internet appliance, a set top box, a headset (e.g., an augmented reality (AR) headset, a virtual reality (VR) headset, etc.) or other wearable device, or any other type of computing device.

The processor platform 1300 of the illustrated example includes processor circuitry 1312. The processor circuitry 1312 of the illustrated example is hardware. For example, the processor circuitry 1312 can be implemented by one or more integrated circuits, logic circuits, FPGAS, microprocessors, CPUs, GPUs, DSPs, and/or microcontrollers from any desired family or manufacturer. The processor circuitry 1312 may be implemented by one or more semiconductor based (e.g., silicon based) devices. In this example, the processor circuitry 1312 implements the text extractor circuitry 1002, the encoder circuitry 1004, the boundary box circuitry 1006, the line parse circuitry 1008, the product code examination circuitry 1010, the product quantity examination circuitry 1012, the product price examination circuitry 1014 and/or the heuristic circuitry 1000.

The processor circuitry 1312 of the illustrated example includes a local memory 1313 (e.g., a cache, registers, etc.). The processor circuitry 1312 of the illustrated example is in communication with a main memory including a volatile memory 1314 and a non-volatile memory 1316 by a bus 1318. The volatile memory 1314 may be implemented by Synchronous Dynamic Random Access Memory (SDRAM), Dynamic Random Access Memory (DRAM), RAMBUSR Dynamic Random Access Memory (RDRAM®), and/or any other type of RAM device. The non-volatile memory 1316 may be implemented by flash memory and/or any other desired type of memory device. Access to the main memory 1314, 1316 of the illustrated example is controlled by a memory controller 1317.

The processor platform 1300 of the illustrated example also includes interface circuitry 1320. The interface circuitry 1320 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1322 are connected to the interface circuitry 1320. The input device(s) 1322 permit(s) a user to enter data and/or commands into the processor circuitry 1312. The input device(s) 1322 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1324 are also connected to the interface circuitry 1320 of the illustrated example. The output device(s) 1324 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1320 of the illustrated example, thus, typically includes a graphics driver card, a graphics driver chip, and/or graphics processor circuitry such as a GPU.

The interface circuitry 1320 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1326. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1300 of the illustrated example also includes one or more mass storage devices 1328 to store software and/or data.

Examples of such mass storage devices 1328 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 1332, which may be implemented by the machine readable instructions of FIGS. 11 and 12, may be stored in the mass storage device 1328, in the volatile memory 1314, in the non-volatile memory 1316, and/or on a removable non-transitory computer readable storage medium such as a CD or DVD.

Figure 14:
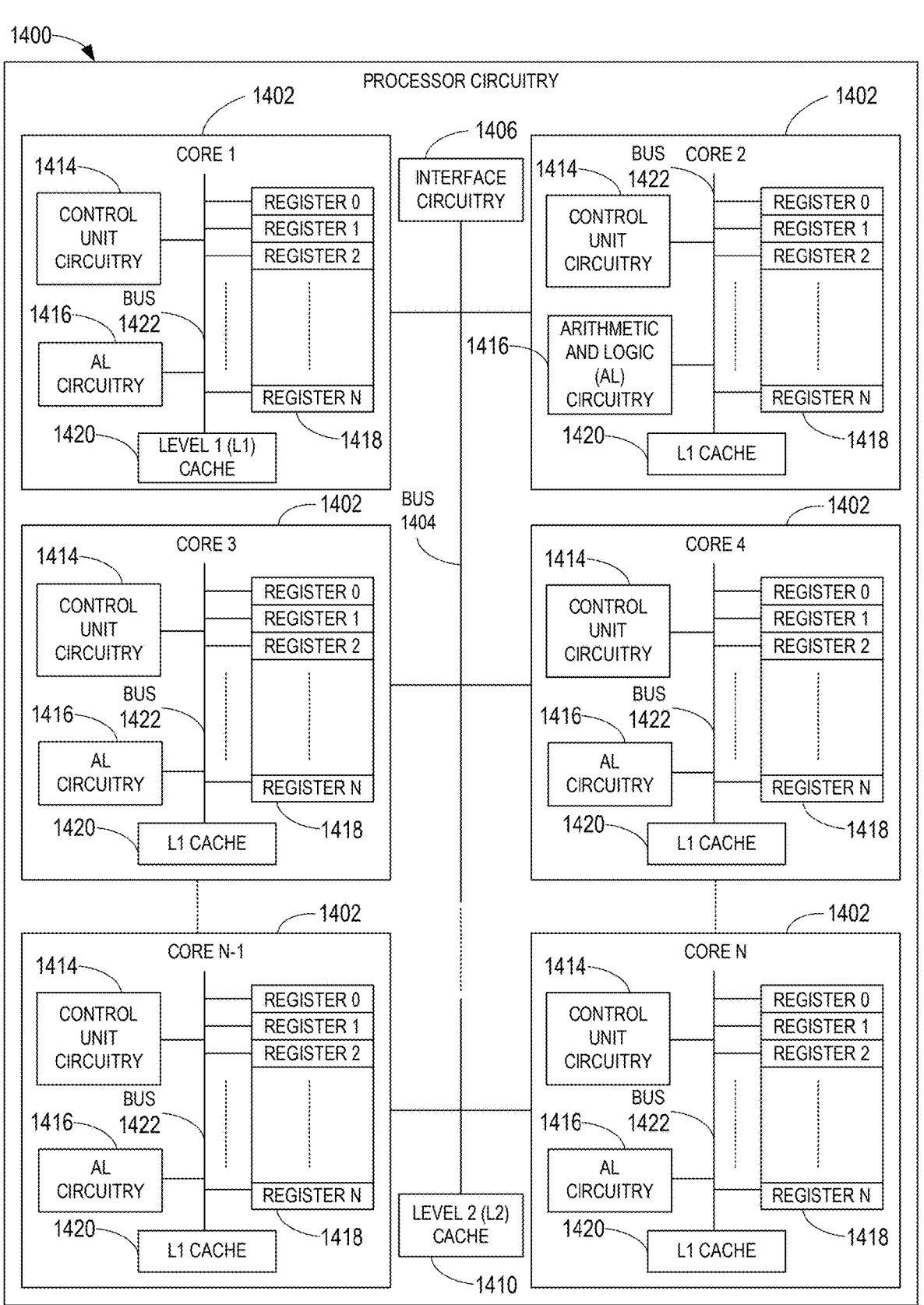
FIG. 14 is a block diagram of an example implementation of the processor circuitry of FIG. 13.

FIG. 14 is a block diagram of an example implementation of the processor circuitry 1312 of FIG. 13. In this example, the processor circuitry 1312 of FIG. 13 is implemented by a microprocessor 1400. For example, the microprocessor 1400 may be a general purpose microprocessor (e.g., general purpose microprocessor circuitry). The microprocessor 1400 executes some or all of the machine readable instructions of the flowcharts of FIGS. 11 and 12 to effectively instantiate the circuitry of FIG. 10 as logic circuits to perform the operations corresponding to those machine readable instructions. In some such examples, the circuitry of FIG. 10 is instantiated by the hardware circuits of the microprocessor 1400 in combination with the instructions. For example, the microprocessor 1400 may be implemented by multi-core hardware circuitry such as a CPU, a DSP, a GPU, an XPU, etc. Although it may include any number of example cores 1402 (e.g., 1 core), the microprocessor 1400 of this example is a multi-core semiconductor device including N cores. The cores 1402 of the microprocessor 1400 may operate independently or may cooperate to execute machine readable instructions. For example, machine code corresponding to a firmware program, an embedded software program, or a software program may be executed by one of the cores 1402 or may be executed by multiple ones of the cores 1402 at the same or different times. In some examples, the machine code corresponding to the firmware program, the embedded software program, or the software program is split into threads and executed in parallel by two or more of the cores 1402.

The software program may correspond to a portion or all of the machine readable instructions and/or operations represented by the flowcharts of FIGS. 11 and 12.

The cores 1402 may communicate by a first example bus 1404. In some examples, the first bus 1404 may be implemented by a communication bus to effectuate communication associated with one(s) of the cores 1402. For example, the first bus 1404 may be implemented by at least one of an Inter-Integrated Circuit (I2C) bus, a Serial Peripheral Interface (SPI) bus, a PCI bus, or a PCIe bus. Additionally or alternatively, the first bus 1404 may be implemented by any other type of computing or electrical bus. The cores 1402 may obtain data, instructions, and/or signals from one or more external devices by example interface circuitry 1406. The cores 1402 may output data, instructions, and/or signals to the one or more external devices by the interface circuitry 1406. Although the cores 1402 of this example include example local memory 1420 (e.g., Level 1 (L1) cache that may be split into an L1 data cache and an L1 instruction cache), the microprocessor 1400 also includes example shared memory 1410 that may be shared by the cores (e.g., Level 2 (L2 cache)) for high-speed access to data and/or instructions. Data and/or instructions may be transferred (e.g., shared) by writing to and/or reading from the shared memory 1410. The local memory 1420 of each of the cores 1402 and the shared memory 1410 may be part of a hierarchy of storage devices including multiple levels of cache memory and the main memory (e.g., the main memory 1314, 1316 of FIG. 13). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1402 may be referred to as a CPU, DSP, GPU, etc., or any other type of hardware circuitry. Each core 1402 includes control unit circuitry 1414, arithmetic and logic (AL) circuitry (sometimes referred to as an ALU) 1416, a plurality of registers 1418, the local memory 1420, and a second example bus 1422. Other structures may be present. For example, each core 1402 may include vector unit circuitry, single instruction multiple data (SIMD) unit circuitry, load/store unit (LSU) circuitry, branch/jump unit circuitry, floating-point unit (FPU) circuitry, etc. The control unit circuitry 1414 includes semiconductor-based circuits structured to control (e.g., coordinate) data movement within the corresponding core 1402. The AL circuitry 1416 includes semiconductor-based circuits structured to perform one or more mathematic and/or logic operations on the data within the corresponding core 1402. The AL circuitry 1416 of some examples performs integer based operations. In other examples, the AL circuitry 1416 also performs floating point operations. In yet other examples, the AL circuitry 1416 may include first AL circuitry that performs integer based operations and second AL circuitry that performs floating point operations. In some examples, the AL circuitry 1416 may be referred to as an Arithmetic Logic Unit (ALU). The registers 1418 are semiconductor-based structures to store data and/or instructions such as results of one or more of the operations performed by the AL circuitry 1416 of the corresponding core 1402. For example, the registers 1418 may include vector register(s), SIMD register(s), general purpose register(s), flag register(s), segment register(s), machine specific register(s), instruction pointer register(s), control register(s), debug register(s), memory management register(s), machine check register(s), etc. The registers 1418 may be arranged in a bank as shown in FIG. 14. Alternatively, the registers 1418 may be organized in any other arrangement, format, or structure including distributed throughout the core 1402 to shorten access time. The second bus 1422 may be implemented by at least one of an I2C bus, a SPI bus, a PCI bus, or a PCIe bus Each core 1402 and/or, more generally, the microprocessor 1400 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1400 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 15:
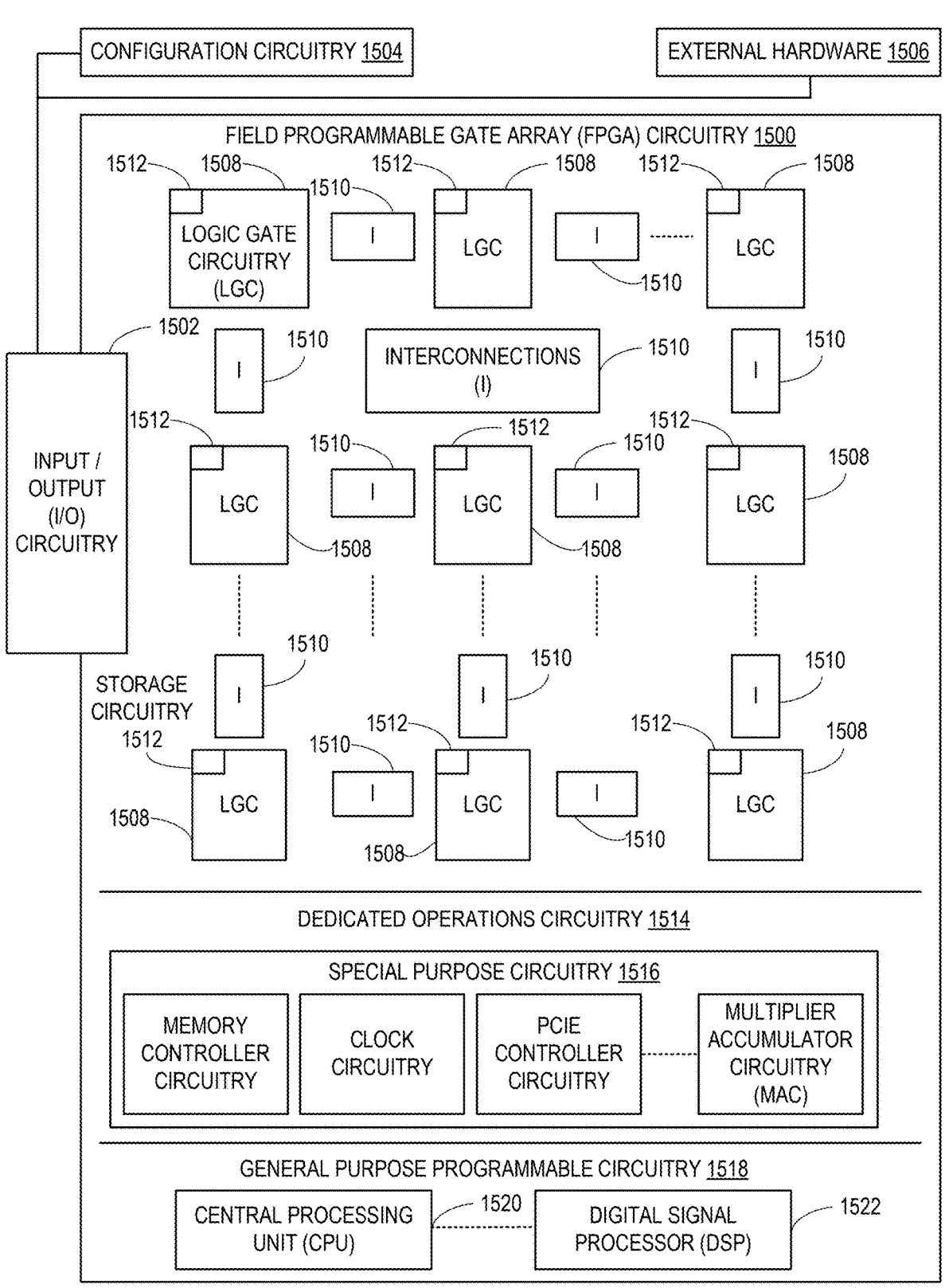
FIG. 15 is a block diagram of another example implementation of the processor circuitry of FIG. 13.

FIG. 15 is a block diagram of another example implementation of the processor circuitry 1312 of FIG. 13. In this example, the processor circuitry 1312 is implemented by FPGA circuitry 1500. For example, the FPGA circuitry 1500 may be implemented by an FPGA. The FPGA circuitry 1500 can be used, for example, to perform operations that could otherwise be performed by the example microprocessor 1400 of FIG. 14 executing corresponding machine readable instructions. However, once configured, the FPGA circuitry 1500 instantiates the machine readable instructions in hardware and, thus, can often execute the operations faster than they could be performed by a general purpose microprocessor executing the corresponding software.

More specifically, in contrast to the microprocessor 1400 of FIG. 14 described above (which is a general purpose device that may be programmed to execute some or all of the machine readable instructions represented by the flowcharts of FIGS. 11 and 12 but whose interconnections and logic circuitry are fixed once fabricated), the FPGA circuitry 1500 of the example of FIG. 15 includes interconnections and logic circuitry that may be configured and/or interconnected in different ways after fabrication to instantiate, for example, some or all of the machine readable instructions represented by the flowcharts of FIGS. 11 and 12. In particular, the FPGA circuitry 1500 may be thought of as an array of logic gates, interconnections, and switches. The switches can be programmed to change how the logic gates are interconnected by the interconnections, effectively forming one or more dedicated logic circuits (unless and until the FPGA circuitry 1500 is reprogrammed). The configured logic circuits enable the logic gates to cooperate in different ways to perform different operations on data received by input circuitry. Those operations may correspond to some or all of the software represented by the flowcharts of FIGS. 11 and 12. As such, the FPGA circuitry 1500 may be structured to effectively instantiate some or all of the machine readable instructions of the flowcharts of FIGS. 11 and 12 as dedicated logic circuits to perform the operations corresponding to those software instructions in a dedicated manner analogous to an ASIC. Therefore, the FPGA circuitry 1500 may perform the operations corresponding to the some or all of the machine readable instructions of FIGS. 11 and 12 faster than the general purpose microprocessor can execute the same.

In the example of FIG. 15, the FPGA circuitry 1500 is structured to be programmed (and/or reprogrammed one or more times) by an end user by a hardware description language (HDL) such as Verilog. The FPGA circuitry 1500 of FIG. 15, includes example input/output (I/O) circuitry 1502 to obtain and/or output data to/from example configuration circuitry 1504 and/or external hardware 1506. For example, the configuration circuitry 1504 may be implemented by interface circuitry that may obtain machine readable instructions to configure the FPGA circuitry 1500, or portion(s) thereof. In some such examples, the configuration circuitry 1504 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1506 may be implemented by external hardware circuitry. For example, the external hardware 1506 may be implemented by the microprocessor 1400 of FIG. 14. The FPGA circuitry 1500 also includes an array of example logic gate circuitry 1508, a plurality of example configurable interconnections 1510, and example storage circuitry 1512. The logic gate circuitry 1508 and the configurable interconnections 1510 are configurable to instantiate one or more operations that may correspond to at least some of the machine readable instructions of FIGS. 11 and 12 and/or other desired operations. The logic gate circuitry 1508 shown in FIG. 15 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1508 to enable configuration of the electrical structures and/or the logic gates to form circuits to perform desired operations. The logic gate circuitry 1508 may include other electrical structures such as look-up tables (LUTs), registers (e.g., flip-flops or latches), multiplexers, etc.

The configurable interconnections 1510 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1508 to program desired logic circuits.

The storage circuitry 1512 of the illustrated example is structured to store result(s) of the one or more of the operations performed by corresponding logic gates. The storage circuitry 1512 may be implemented by registers or the like. In the illustrated example, the storage circuitry 1512 is distributed amongst the logic gate circuitry 1508 to facilitate access and increase execution speed.

The example FPGA circuitry 1500 of FIG. 15 also includes example Dedicated Operations Circuitry 1514. In this example, the Dedicated Operations Circuitry 1514 includes special purpose circuitry 1516 that may be invoked to implement commonly used functions to avoid the need to program those functions in the field. Examples of such special purpose circuitry 1516 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1500 may also include example general purpose programmable circuitry 1518 such as an example CPU 1520 and/or an example DSP 1522. Other general purpose programmable circuitry 1518 may additionally or alternatively be present such as a GPU, an XPU, etc., that can be programmed to perform other operations.

Although FIGS. 14 and 15 illustrate two example implementations of the processor circuitry 1312 of FIG. 13, many other approaches are contemplated. For example, as mentioned above, modern FPGA circuitry may include an onboard CPU, such as one or more of the example CPU 1520 of FIG. 15. Therefore, the processor circuitry 1312 of FIG. 13 may additionally be implemented by combining the example microprocessor 1400 of FIG. 14 and the example FPGA circuitry 1500 of FIG. 15. In some such hybrid examples, a first portion of the machine readable instructions represented by the flowcharts of FIGS. 11 and 12 may be executed by one or more of the cores 1402 of FIG. 14, a second portion of the machine readable instructions represented by the flowcharts of FIGS. 11 and 12 may be executed by the FPGA circuitry 1500 of FIG. 15, and/or a third portion of the machine readable instructions represented by the flowcharts of FIGS. 11 and 12 may be executed by an ASIC. It should be understood that some or all of the circuitry of FIG. 10 may, thus, be instantiated at the same or different times. Some or all of the circuitry may be instantiated, for example, in one or more threads executing concurrently and/or in series. Moreover, in some examples, some or all of the circuitry of FIG. 10 may be implemented within one or more virtual machines and/or containers executing on the microprocessor.

In some examples, the processor circuitry 1312 of FIG. 13 may be in one or more packages. For example, the microprocessor 1400 of FIG. 14 and/or the FPGA circuitry 1500 of FIG. 15 may be in one or more packages. In some examples, an XPU may be implemented by the processor circuitry 1312 of FIG. 13, which may be in one or more packages. For example, the XPU may include a CPU in one package, a DSP in another package, a GPU in yet another package, and an FPGA in still yet another package.

Figure 16:
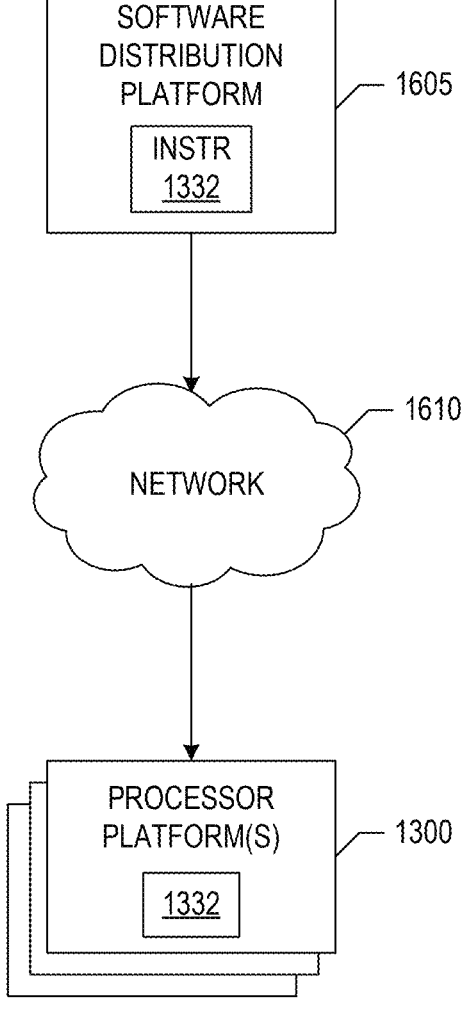
FIG. 16 is a block diagram of an example software distribution platform (e.g., one or more servers) to distribute software (e.g., software corresponding to the example machine readable instructions of FIGS. 11 and 12) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1605 to distribute software such as the example machine readable instructions 1332 of FIG. 13 to hardware devices owned and/or operated by third parties is illustrated in FIG. 16. The example software distribution platform 1605 may be implemented by any computer server, data facility, cloud service, etc., capable of storing and transmitting software to other computing devices. The third parties may be customers of the entity owning and/or operating the software distribution platform 1605. For example, the entity that owns and/or operates the software distribution platform 1605 may be a developer, a seller, and/or a licensor of software such as the example machine readable instructions 1332 of FIG. 13. The third parties may be consumers, users, retailers, OEMs, etc., who purchase and/or license the software for use and/or re-sale and/or sub-licensing. In the illustrated example, the software distribution platform 1605 includes one or more servers and one or more storage devices. The storage devices store the machine readable instructions 1332, which may correspond to the example machine readable instructions of FIGS. 11 and 12, as described above. The one or more servers of the example software distribution platform 1605 are in communication with an example network 1610, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1332 from the software distribution platform 1605. For example, the software, which may correspond to the example machine readable instructions of FIGS. 11 and 12, may be downloaded to the example processor platform 1300, which is to execute the machine readable instructions 1332 to implement the heuristic circuitry 1000. In some examples, one or more servers of the software distribution platform 1605 periodically offer, transmit, and/or force updates to the software (e.g., the example machine readable instructions 1332 of FIG. 13) to ensure improvements, patches, updates, etc., are distributed and applied to the software at the end user devices.

From the foregoing, it will be appreciated that example systems, methods, apparatus, and articles of manufacture have been disclosed that improve entity tagging accuracy. In some disclosed examples, traditional entity tagging techniques, systems and/or services fail to identify a sufficient number and/or type of entity on a document of interest, such as a retail receipt, purchase document, etc. While existing entity tagging techniques employ AI/ML algorithms that have improved over the years, such techniques still cause errors that require re-tagging efforts to correct. Examples disclosed herein reduce a need for additional re-tagging efforts that utilize computationally intensive resources to make sure a sufficient quantity and/or type of entity is identified on documents of interest. Disclosed systems, methods, apparatus, and articles of manufacture are accordingly directed to one or more improvement(s) in the operation of a machine such as a computer or other electronic and/or mechanical device.

Example methods, apparatus, systems, and articles of manufacture to improve tagging accuracy are disclosed herein. Further examples and combinations thereof include the following:

Example 1 includes an apparatus to identify entities on a document, the apparatus comprising interface circuitry to acquire entity information corresponding to the document, and processor circuitry including one or more of at least one of a central processor unit, a graphics processor unit, or a digital signal processor, the at least one of the central processor unit, the graphics processor unit, or the digital signal processor having control circuitry to control data movement within the processor circuitry, arithmetic and logic circuitry to perform one or more first operations corresponding to instructions, and one or more registers to store a result of the one or more first operations, the instructions in the apparatus, a Field Programmable Gate Array (FPGA), the FPGA including logic gate circuitry, a plurality of configurable interconnections, and storage circuitry, the logic gate circuitry and the plurality of the configurable interconnections to perform one or more second operations, the storage circuitry to store a result of the one or more second operations, or Application Specific Integrated Circuitry (ASIC) including logic gate circuitry to perform one or more third operations, the processor circuitry to perform at least one of the first operations, the second operations, or the third operations to instantiate line parse circuitry to identify a first row of the document containing a first type of entity, and identify a second type of entity missing from the first row of the document, and product code examination circuitry to search the first row of the document for a first integer value, and associate the first row with a product corresponding to the first integer value.

Example 2 includes the apparatus as defined in example 1, further including product quantity analysis circuitry to search the first row of the document for a second integer value less than the first integer value.

Example 3 includes the apparatus as defined in example 2, wherein the product quantity analysis circuitry is to associate the first row with a quantity value corresponding to the second integer value.

Example 4 includes the apparatus as defined in example 1, further including product price analysis circuitry to search the first row of the document for a decimal value.

Example 5 includes the apparatus as defined in example 4, wherein the product price analysis circuitry is to associate the first row with a price value corresponding to the decimal value.

Example 6 includes the apparatus as defined in example 1, wherein the first type of entity includes product description information and the second type of entity includes at least one of product code information, product quantity information, or product price information.

Example 7 includes At least one non-transitory machine readable medium comprising instructions that, when executed, cause a machine to at least search a first row of a document to identify a first row that includes a first type of entity, search the first row of the document to identify a second type of entity that is missing, search the first row of the document to identify a first integer value, and associate the first row with a product corresponding to the first integer value.

Example 8 includes the at least one non-transitory machine readable medium as defined in example 7, wherein the instructions, when executed, cause the machine to search the first row of the document for a second integer value that is less than the first integer value.

Example 9 includes the at least one non-transitory machine readable medium as defined in example 8, wherein the instructions, when executed, cause the machine to associate the first row with a quantity value corresponding to the second integer value.

Example 10 includes the at least one non-transitory machine readable medium as defined in example 7, wherein the instructions, when executed, cause the machine to search the first row of the document to identify a decimal value.

Example 11 includes the at least one non-transitory machine readable medium as defined in example 10, wherein the instructions, when executed, cause the machine to associate the first row with a price value corresponding to the decimal value.

Example 12 includes the at least one non-transitory machine readable medium as defined in example 7, wherein the instructions, when executed, cause the machine to determine that the first type of entity includes product description information and determine the second type of entity includes at least one of product code information, product quantity information, or product price information.

Example 13 includes an apparatus comprising at least one memory, machine readable instructions, and processor circuitry to execute the machine readable instructions to at least search a first row of a document to identify a first row that includes a first type of entity, search the first row of the document to identify a second type of entity that is missing, search the first row of the document to identify a first integer value, and associate the first row with a product corresponding to the first integer value.

Example 14 includes the apparatus as defined in example 13, wherein the processor circuitry is to search the first row of the document for a second integer value that is less than the first integer value.

Example 15 includes the apparatus as defined in example 14, wherein the processor circuitry is to associate the first row with a quantity value corresponding to the second integer value.

Example 16 includes the apparatus as defined in example 13, wherein the processor circuitry is to search the first row of the document to identify a decimal value.

Example 17 includes the apparatus as defined in example 16, wherein the processor circuitry is to associate the first row with a price value corresponding to the decimal value.

Example 18 includes the apparatus as defined in example 13, wherein the processor circuitry is to determine that the first type of entity includes product description information and determine the second type of entity includes at least one of product code information, product quantity information, or product price information.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. At least one non-transitory machine readable medium comprising instructions to cause at least one programmable circuit to at least:

perform Optical Character Recognition (OCR) on an image of a document to generate OCR data;

search the OCR data to identify a first row that includes product description information;

search the OCR data to identify at least one of a product code of a product identified by the product description information, a product quantity of the product, or a price of the product that is missing from the first row; and identifying the at least one of the missing product code, the missing product quantity or the missing price by at least one of:

identifying a maximum integer value in the OCR data as the missing product code product code;

identifying a minimum integer value in the OCR data as the product quantity; or identifying a decimal value in the OCR data as the price; and retrain a machine learning model based on at last one of the maximum integer value, the minimum integer value, or the decimal value.

2. The at least one non-transitory machine readable medium of claim 1, wherein the product code is a first product code, the product quantity is a first product quantity, the price is a first price, and the document is a first document, wherein the instructions cause the at least one programmable circuit to retrain the model to automatically detect a second product code, a second product quantity, and a second price in a second document.

3. The at least one non-transitory machine readable medium of claim 1, wherein the model includes processing key information extraction from documents using improved graph learning convolutional networks.

4. The at least one non-transitory machine readable medium of claim 1, wherein the model is to transform key information extraction into a sequence tagging based on layout of the document.

5. The at least one non-transitory machine readable medium of claim 1, wherein the document is physical and the OCR data is digital.

6. An apparatus comprising:

at least one memory;

machine readable instructions; and at least one programmable circuit to execute the machine readable instructions to at least:

perform Optical Character Recognition (OCR) on an image of a document to generate OCR data;

search the OCR data to identify a first row that includes product description information;

search the OCR data to identify at least one of a product code, a product quantity, or a price that is missing from the first row;

search the OCR data to identify integer values;

identify the maximum integer value of the integer values;

identify the minimum integer value of the integer values;

associate, when the maximum integer value is different than the minimum integer value, the maximum integer value with the product code;

associate, when the minimum integer value is different than the maximum integer value, the minimum integer value with the product quantity;

search the OCR data for a decimal value;

associate the decimal value with the price; and retrain a machine learning model based on at least one of the product code, the product quantity, or the price.

7. The apparatus of claim 6, wherein the product code is a first product code, the product quantity is a first product quantity, the price is a first price, and the document is a first document, and wherein at least one of the at least one programmable circuit is to retrain the model to automatically detect a second product code, a second product quantity, and a second price in a second document.

8. The apparatus of claim 6, wherein the model includes processing key information extraction from documents using improved graph learning convolutional networks.

9. The apparatus of claim 6, wherein the model is to transform key information extraction into a sequence tagging based on layout of the document.

10. The apparatus of claim 6, wherein the document is physical and the OCR data is digital.

\* \* \* \* \*